United States Patent
Kwan

(10) Patent No.: US 8,285,995 B2
(45) Date of Patent: *Oct. 9, 2012

(54) SYSTEM AND METHOD FOR DIGITALLY MARKING A FILE WITH A REMOVABLE MARK

(75) Inventor: John Man Kwong Kwan, Sunnyvale, CA (US)

(73) Assignee: Kwan Software Engineering, Inc., Santa Clara, CA (US)

( * ) Notice: Subject to any disclaimer, the term of this patent is extended or adjusted under 35 U.S.C. 154(b) by 987 days.

This patent is subject to a terminal disclaimer.

(21) Appl. No.: 10/828,956

(22) Filed: Apr. 20, 2004

(65) Prior Publication Data

US 2004/0199772 A1 Oct. 7, 2004

Related U.S. Application Data

(63) Continuation of application No. 09/528,362, filed on Mar. 17, 2000, now Pat. No. 6,792,535, which is a continuation-in-part of application No. 09/287,537, filed on Apr. 6, 1999, now Pat. No. 6,434,701.

(60) Provisional application No. 60/174,301, filed on Jan. 3, 2000.

(51) Int. Cl.
*H04L 9/32* (2006.01)

(52) U.S. Cl. .......... 713/176; 382/194

(58) Field of Classification Search .......... 713/176; 380/200–202, 210; 382/194, 236, 245, 239, 382/283
See application file for complete search history.

(56) References Cited

U.S. PATENT DOCUMENTS

| | | | |
|---|---|---|---|
| 5,251,028 A * | 10/1993 | Iu | 348/400.1 |
| 5,524,067 A | 6/1996 | Miyake et al. | |
| 5,636,292 A | 6/1997 | Rhoads | |
| 5,646,997 A | 7/1997 | Barton | |
| 5,659,726 A | 8/1997 | Sandford, II et al. | |
| 5,664,018 A | 9/1997 | Leighton | |
| 5,666,417 A | 9/1997 | Liang et al. | |
| 5,689,305 A * | 11/1997 | Ng et al. | 375/240.15 |
| 5,710,834 A | 1/1998 | Rhoads | |
| 5,721,788 A | 2/1998 | Powell et al. | |
| 5,745,604 A | 4/1998 | Rhoads | |
| 5,748,763 A | 5/1998 | Rhoads | |
| 5,748,783 A | 5/1998 | Rhoads | |
| 5,771,292 A | 6/1998 | Zunquan | |

(Continued)

OTHER PUBLICATIONS

G. Caronni, "Assuring Ownership Rights for Digital Images," Proceedings Der Gi-Fachtagung VIS, XX, XX, 1995; pp. 251-263, XP000668970.

(Continued)

*Primary Examiner* — Nirav B Patel
(74) *Attorney, Agent, or Firm* — GSS Law Group

(57) ABSTRACT

A system enables encoding of a removable mark into digital data, and decoding of the mark from the digital data. The system comprises an encoder and a decoder. The encoder includes a target area locator for locating in digital data a predetermined pattern of values that represents a flat area, and a marker for modifying values in the flat area to encode a mark into the flat area. The decoder attempts to extract the mark from the digital data. The decoder includes a mark area locator for locating a predetermined pattern of values in digital data, and an unmarker coupled to the mark area locator for examining the values to determine the state of each value and extract an embedded mark from the predetermined pattern of values.

19 Claims, 18 Drawing Sheets

U.S. PATENT DOCUMENTS

| | | | |
|---|---|---|---|
| 5,819,289 A | 10/1998 | Sanford, II et al. | |
| 5,822,436 A | 10/1998 | Rhoads | |
| 5,825,892 A | 10/1998 | Braudaway et al. | |
| 5,832,119 A | 11/1998 | Rhoads | |
| 5,841,886 A | 11/1998 | Rhoads | |
| 5,841,978 A | 11/1998 | Rhoads | |
| 5,850,466 A * | 12/1998 | Schott | 382/141 |
| 5,850,481 A | 12/1998 | Rhoads | |
| 5,862,260 A | 1/1999 | Rhoads | |
| 5,889,868 A | 3/1999 | Moskowitz et al. | |
| 5,898,779 A | 4/1999 | Squilla et al. | |
| 5,905,800 A | 5/1999 | Moskowitz et al. | |
| 5,915,027 A | 6/1999 | Cox et al. | |
| 5,930,369 A | 7/1999 | Cox et al. | |
| 5,949,885 A | 9/1999 | Leighton | |
| 5,960,081 A | 9/1999 | Vynne et al. | |
| 5,995,630 A | 11/1999 | Borza | |
| 6,002,772 A | 12/1999 | Saito | |
| 6,021,227 A * | 2/2000 | Sapiro et al. | 382/239 |
| 6,049,627 A | 4/2000 | Becker et al. | |
| 6,069,914 A | 5/2000 | Cox | |
| 6,072,888 A | 6/2000 | Powell et al. | |
| 6,128,736 A | 10/2000 | Miller | |
| 6,208,745 B1 | 3/2001 | Florencio et al. | |
| 6,434,701 B1 * | 8/2002 | Kwan | 713/176 |
| 6,512,537 B1 * | 1/2003 | Shimizu et al. | 348/155 |
| 6,711,276 B1 * | 3/2004 | Yoshiura et al. | 382/100 |
| 6,728,408 B1 * | 4/2004 | Echizen et al. | 382/232 |
| 6,792,535 B1 * | 9/2004 | Kwan | 713/176 |
| 2001/0020270 A1 | 9/2001 | Yeung et al. | |
| 2002/0029338 A1 | 3/2002 | Bloom et al. | |

OTHER PUBLICATIONS

T. Nakamura, et al., "A Watermark Technique for Still Images," NTT Review, JP, Telecommunications Association, Tokyo, vol. 11, No. 1, Jan. 1999; pp. 124-128, XP000804415.

W. Bender, et al. "Tecchniques for Data Hiding," IBM Systems Journal, US, IBM Corp. Armonk, New York, 35, No. 3/04. 1996; pp. 313-335, XP000635079.

M. D. Swanson, et al., "Current State of the Art, Challenges and Future Directions for Audio Watermarking," Proceedings IEEE International Conference on Multimedia Computing Systems: Proceedings of ICMCS99: IEEE Multimedia Systems '99: International Conference on Multimedia Computing and Systems, Florence, Italy, 7-11, vol. 1, Jun. 1999' pp. 19-24, XP002146171.

* cited by examiner (Decode)

SYSTEM AND METHOD FOR DIGITALLY MARKING A FILE WITH A REMOVABLE MARK

PRIORITY REFERENCE TO PRIOR APPLICATION

The present application is also a continuation of, and claims priority of patent application Ser. No. 09/528,362, filed Mar. 17, 2000, entitled: "System and Method for Digitally Marking a File with a Removeable Mark" now U.S. Pat. No. 6,792,535, which (a) is a continuation-in-pat application of, and claims priority of, patent application Ser. No. 09/287,537 now U.S. Pat. No. 6,434,701, entitled "System and Method for Digitally Marking a File," filed on Apr. 6, 1999, by inventory John Man Kwong Kwan, and [b] claims the benefit of the priority date of provisional patent application Ser. No. 60/174,301, entitled "System and Method for Digitally Marking a File with a Removable Mark," filed on Jan. 3, 2000 by inventory John Man Kwong Kwan. The specification and drawings of the above-identified patent applications are hereby incorporated by reference in their entirety.

COPY AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to computer systems, and more particularly provides a system and method for digitally marking a file with a removable mark.

2. Description of the Background Art

Real world data, such as audio and video data, are recorded on various mediums. Older technology, such as analog audio and video tapes, analog photographs, television and radio signals, etc., record real world data in analog form. Analog data on an analog medium is difficult to modify undetectably.

However, modern systems use digital technology. Examples of such systems include digital audio recordings on tape or CD's or computer memory or hard disks, digital still or motion pictures on tape or DVD's or in computer memory or hard disks, digital still or motion pictures or digital audio data sent over the phone lines or on computer networks, digital audio signals sent over the radio waves in devices such as digital microphones or cordless telephones. Because of the ease of data manipulation of a digital file, it is difficult to detect whether recorded digital data is the original real world data or a modified version.

Some prior digital imaging systems add a "digital watermark" to an image A user typically selects a region in the image in which to replace the original real world data with a word or symbol. The digital watermark is designed to survive many types of digital editing and alteration. However, the digital watermark irrecoverably sacrifices some of the real world data and merely provides evidence of the origin of the digital work. Further, one hoping to authenticate the contents of the image cannot reasonably assume by locating the watermark in the image that the image contains only the original real world data.

Other prior digital systems append code to the real world data file containing the real world data. However, each system uses a different protocol and format. Thus, when converting a digital file between formats, the appended code is typically discarded as unnecessary. A user can thus modify the contents of the data file undetectably.

Further, compression is a technique used to reduce memory and processor power requisites. When an image is compressed using a form of lossy compression, the image content will be modified.

Therefore, a system and method are needed for encoding into a digital file a mark, which may not irrecoverably sacrifice any of the original data, which may not be lost by converting the file data between different protocols and formats, which my identify the original content, and/or which may survive lossy compression.

SUMMARY OF THE INVENTION

The present invention provides a system and method for marking any data file that contains a "flat" area, i.e., a set of data values wherein all the data values vary within a certain amount of each other. The flat area can be located within any pattern of values. The length of the set can be any number of data values greater than one (1). In a digital picture, examples of flat areas may include a set of navy blue pixels, a set of fire-engine red pixels, etc. In an audio recording, examples of flat areas may include a set of sound samples of a particular volume. Flat areas are almost always found in recordings or transmissions of natural information, e.g., a still picture, a motion picture, an audio recording, an audio transmission, a measurement of radio signals or other forms that occur in nature, etc. Examples of flat areas in real life may be found in data representing a sky, a tree, a speaker's voice, a bass guitar solo, etc.

An example system and method place a content-identifying mark within the flat area of the data file. If alteration is performed on the original data, either the mark will not match the data or the mark itself may be damaged. The system and method attempt to modify the original data as little as possible, enable removal of the mark from the data, and, if unmodified, enable return of the original data. This would help ensure the integrity of the digital data involved and has many applications including ensuring the validity of digital photographs, digital motion pictures and digital voice or sound recordings for use as evidence in a court of law. Another use ensures the validity of scientific research data recorded by instruments or the validity of data transmitted over computer networks, radio transmission or other means. Other example systems and methods can place a copyright notice, an author's name, an identification number, an authenticator's number, the camera manufacturer's number, digital data licensee's information. etc. in the captured frame.

The system comprises an encoder and a decoder. The encoder includes a target area locator for locating in digital data a predetermined pattern of values that represents a flat area, and a marker for modifying values in the flat area to encode a mark into the flat area. The decoder attempts to extract the mark from the digital data. The decoder includes a mark area locator for locating a predetermined pattern of values in digital data, and an unmarker coupled to the mark area locator for examining the values to determine the state of each value and extract an embedded mark from the predetermined pattern of values.

The method comprises an encoding method and a decoding method. The encoding method encodes a mark into digital data, and includes locating in digital data a predetermined pattern of values that represents a flat area, and modifying values in the flat area to encode a mark into the flat area. The decoding method attempts to extract a mark from digital data, and includes locating a predetermined pattern of values in digital data, and examining the values to determine the state of each value and extract an embedded mark from the predetermined pattern of values.

The system and method may advantageously detect altered data to a configurable level of confidence. The system and method may advantageously allow the original digital data to be completely restored to it's unmarked original state. The system and method may mark the digital data in a subtle way, so that the mark is not easily noticed if displayed in it's marked state. The system and method may advantageously require no special preparation of the data. The system and method advantageously may be used with various types of digital data. The system and method advantageously require no human intervention. The system and method may advantageously provide a method of embedding information to survive lossy compression.

BRIEF DESCRIPTION OF THE DRAWINGS

FIG. 2B is a block diagram illustrating an example mark to be embedded into the example flat target area of FIG. 12A;

DETAILED DESCRIPTION OF THE PREFERRED EMBODIMENT

The present invention provides a system and method for marking any data file that contains a "flat area", i.e., a set of data values wherein all the data values vary within a certain amount of each other. The length of the word can be any number of bits greater than one (1). In a digital picture, examples of flat areas may include a set of navy blue pixels, a set of fire-engine red pixels, etc. In an audio recording, examples of flat areas may include a set of sound bits of a particular volume. Flat areas are almost always found in recordings or transmissions of natural information, e.g., a still picture, a motion picture, an audio recording, an audio transmission, a measurement of radio signals or other forms that occur in nature, etc. Examples of flat areas in real life may be found in data representing a sky, a tree, a speaker's voice, a bass guitar solo, etc.

An example system and method place a content-identifying mark within the flat area of the data file. If alteration is performed on the original data, either the mark will not match the data or the mark itself may be damaged. The system and method attempt to modify the original data as little as possible, enable removal of the mark from the data, and if unmodified, enable return of the original data.

Figure 1:
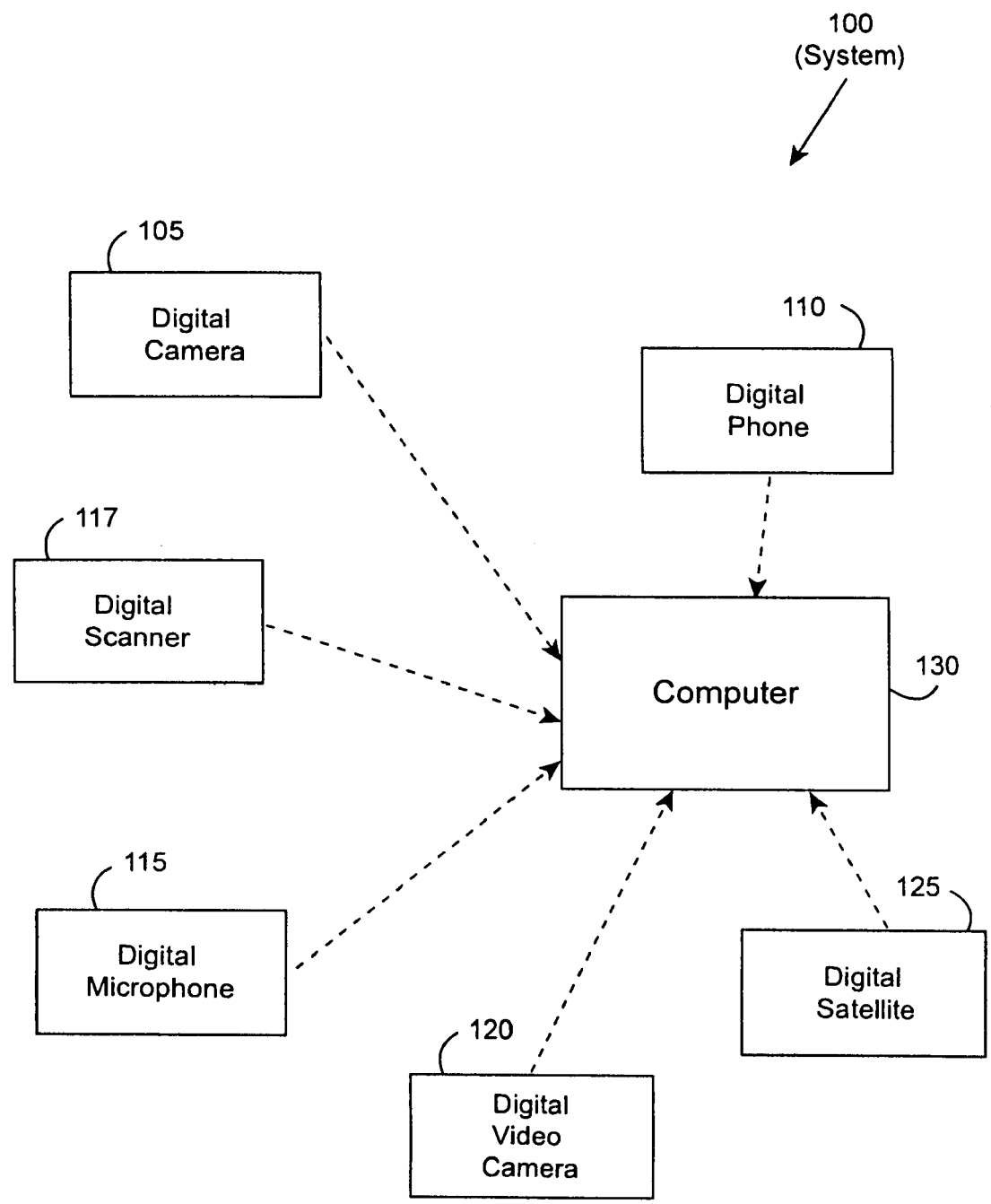
FIG. 1 is a block diagram illustrating a system having various input devices.

FIG. 1 is a block diagram illustrating a system 100 in accordance with the present invention. The system 100 includes various examples of digital input devices 105-125 coupled to a computer 130. The examples include a digital camera 105, a digital phone 110, a digital microphone 115, a digital scanner 117, a digital video camera 120 and a digital satellite 125. Each digital input device 105-125 is capable of receiving and transmitting real world data to the computer 130. The computer 130 encodes a mark within the real world data and enables decoding the mark from the real world data. Although the invention is being described with reference to real world data, one skilled in the art will recognize that the data need not originate from the "real" world and may include generated artwork, digital music, text, etc.

Figure 2A:
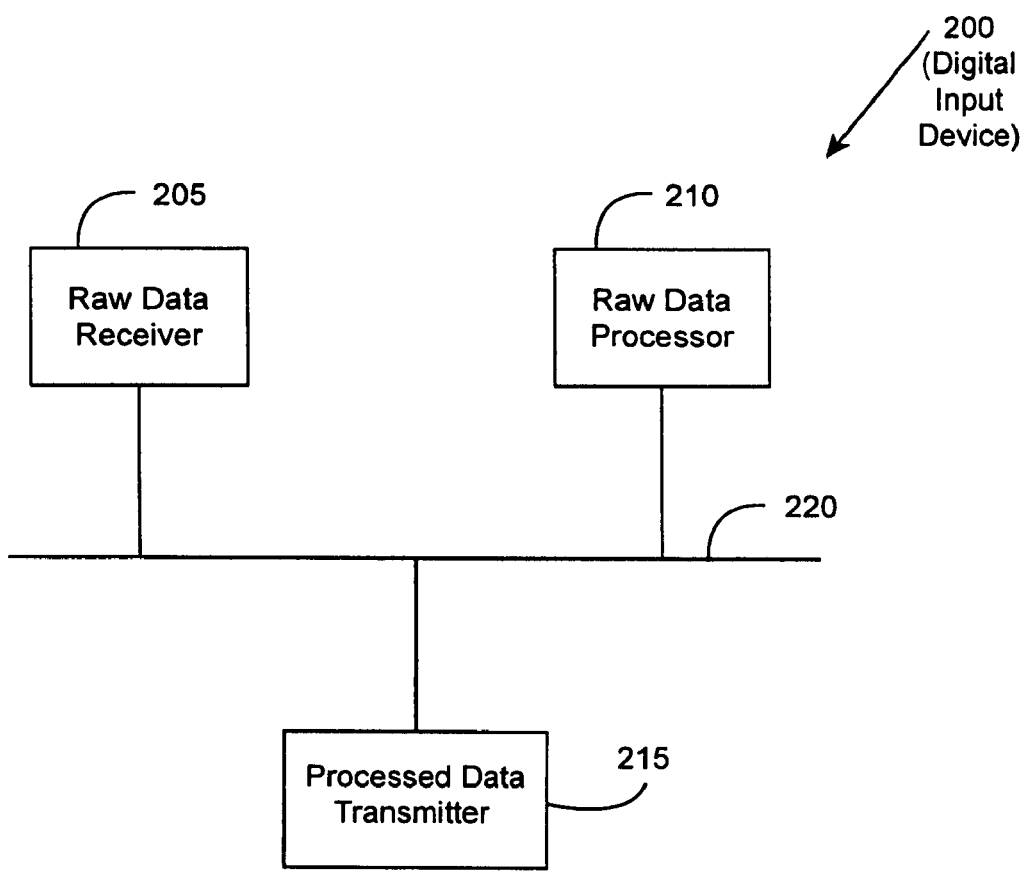
FIG. 2A is a block diagram illustrating details of a digital input device of FIG. 1.

FIG. 2 is a block diagram illustrating details of a generic digital input device 200, of which each of digital input devices 105-125 of FIG. 1 is an instance. Digital input device 200 includes a raw data receiver 205, a raw data processor 210 and a raw data transmitter 215, each coupled together via a communications channel 220. Although the communications channel is being illustrated as a bus-type structure, one skilled in the art will recognize that any communications channel can be used.

The raw data receiver 205 collects data from the real world, and typically includes an analog-to-digital converter. If the digital input device 200 includes a digital camera, the raw data receiver 205 includes the camera part that takes the digital picture of the real world image and converts it to digital data. If the digital input device 200 includes a digital sound recording device, the raw data receiver 205 includes the part that converts sound waves into digital data. The same applies to other devices such as wireless microphones, digital telephones, etc.

The raw data processor 210 performs operations on the raw data received by the raw data receiver 205 to facilitate the storage or transmission of the data. For example, the raw data processor 210 may compress the data, and/or convert the data to a protocol or format applicable to data transmission or data storage, etc. After the raw data processor 210 processes the data, the data is referred to herein as "processed data."

The process data transmitter 215 transmits the processed data via wire, radio waves, etc. from the input device 200 to the computer 130, which encodes the processed data using the reversible technique described below.

Figure 2B:
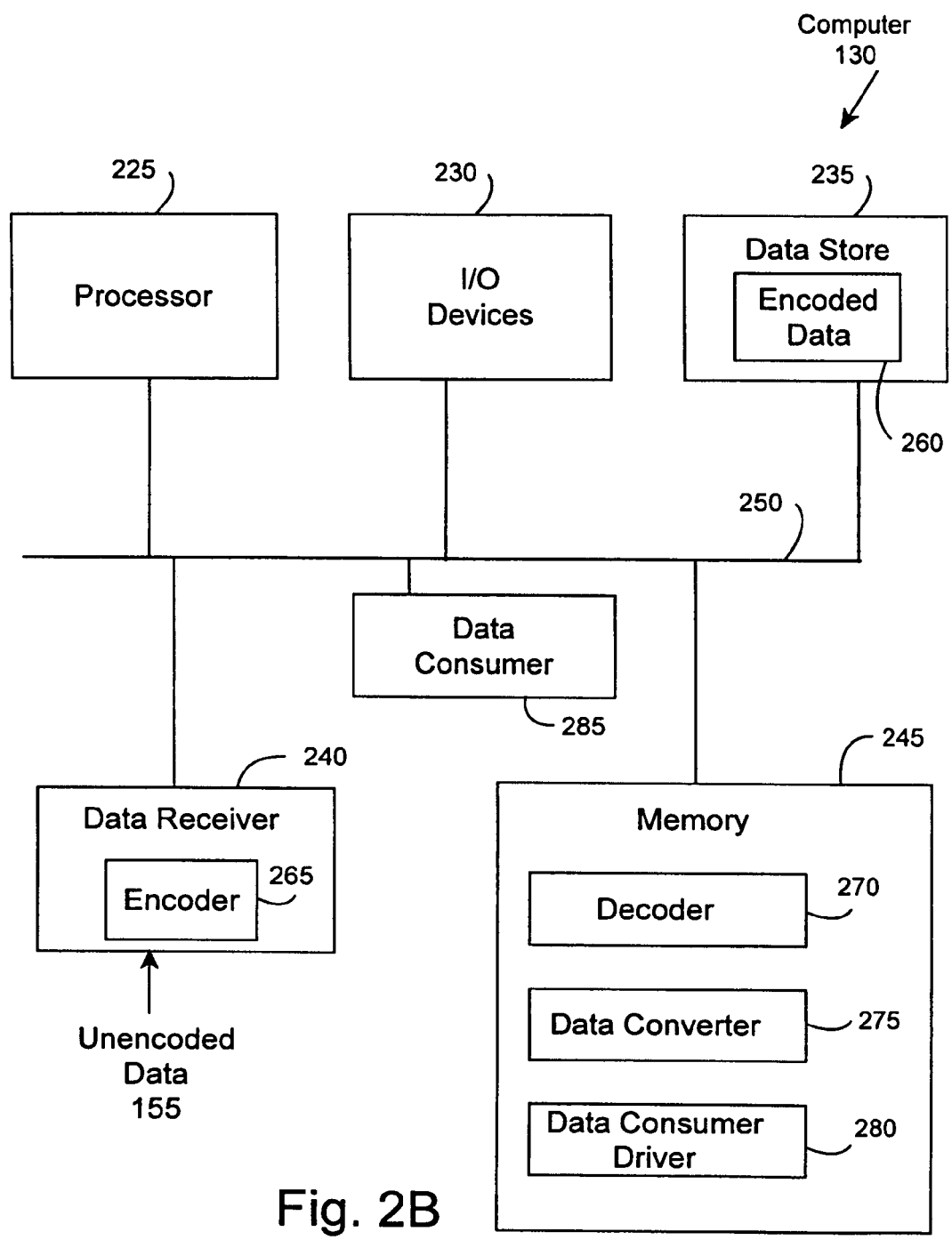
FIG. 2B is a block diagram illustrating details of the computer of FIG. 1.

FIG. 2B is a block diagram illustrating details of the computer 130. The computer 130 includes a processor 225, such as an Intel Pentium® microprocessor or a Motorola Power PC® microprocessor, coupled to a communications channel 250. The computer 130 further includes an input/output (I/O) device 230 such as a keyboard, mouse and display, a data store 235 such as a magnetic disk, a data receiver 240 such as a communications interface, memory 245 such as random-access memory, and a data consumer 285, each coupled to the communications channel 250. It will be appreciated that, although the data store 235 and memory 245 are illustrated as units integral to the computer 130, the data store 235 and memory 245 can be distributed units. It will be further appreciated that the contents of the data store 235 and of the memory 245 may be distributed differently. Further, it will be appreciated that the term "memory" herein is intended to cover all data storage media whether permanent or temporary.

The data receiver 240 receives unencoded data 155 from one of the digital input devices 200. As stated above, the data receiver 240 may receive the unencoded data 155 via a direct connection, via the internet, via a wireless connection, etc. The more secure the connection, the more confidence there will be in the authenticity of the unencoded data 155. Accordingly, it will be appreciated that encryption and decryption techniques may be used when sending the unencoded data 155 across insecure lines. The data receiver 240 is preferably connected directly to the digital input device 200 so that user intervention is not readily possible.

The data receiver 240 includes an encoder 265 for encoding a content-identifying mark into the incoming unencoded data 155. The encoder 265 is described in greater detail with reference to FIG. 3. It will be appreciated that the encoder 265 is preferably located where it can receive the unencoded data 155 before possible manipulation of the data or forgery of the mark, such as within the data input device 200 or within the data receiver 240. As illustrated, the data store 235 stores the encoded data 260.

The memory 245 stores a decoder 270, a data converter 275 and a data consumer driver 280. The decoder 270 detects marks in data-to-be-tested (test data), verifies the authenticity of the test data, and replaces valid marks with original data. The decoder 270 is described in greater detail with reference to FIG. 4.

The data converter 275 decompresses test data decoded by the decoder 270 and/or converts the format or protocol of the test data into a format or protocol that is useful to the data consumer 285. For digital photographs or audio recordings, the data converter 275 may decode the test data into a form that can be viewed, printed, performed, saved to memory, transmitted as an e-mail attachment, sent over a computer network or otherwise used. The term "use" is used herein to include storing, transmitting, performing, presenting, manipulating, printing or otherwise handling the processed data. The data consumer driver 280 drives the data consumer 285, which uses the data. For example, the data consumer 285 may be a speaker, a stereo system, a monitor, a television, a printer, a communications interface, or a storage medium.

One skilled in the art will recognize that the computer 130 may also include other elements, such as network connections, additional memory, additional processors, LANs, input/output lines for transferring information across a hardware channel, the Internet, an intranet, etc. One skilled in the art will also recognize that the programs and data may be received by and stored in the system in alternative ways. For example, although not shown, a computer-readable storage medium (CRSM) reader such as a magnetic disk drive, hard disk drive, magneto-optical reader, CPU, etc. may be coupled to the communications channel 250 for reading a computer-readable storage medium (such as a magnetic disk, a hard disk, a magneto-optical disk, RAM, etc. Accordingly, the computer 130 may receive programs and data via the CRSM reader.

Figure 3:
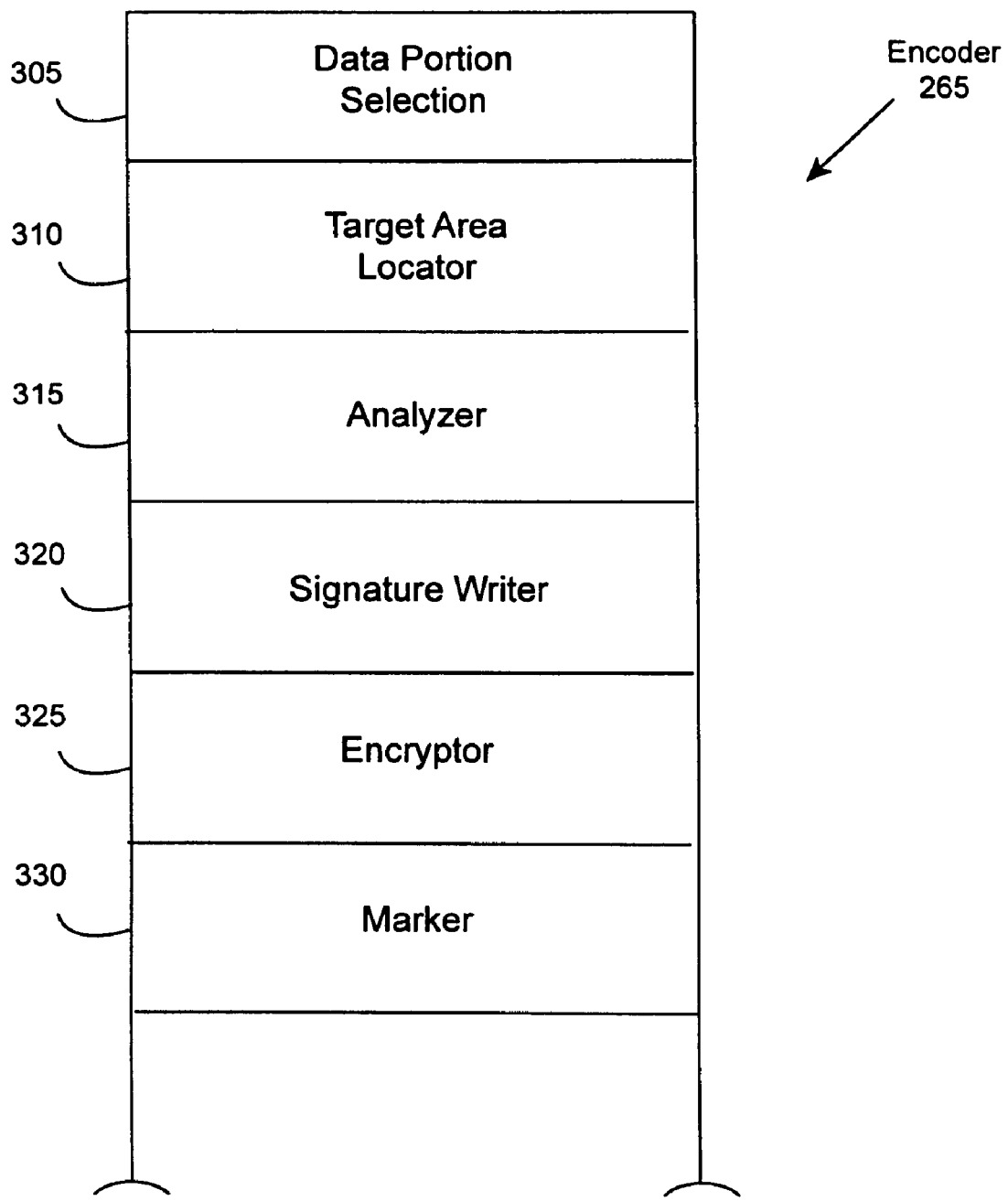
FIG. 3 is a block diagram illustrating details of the encoder of FIG. 2B.

FIG. 3 is a block diagram illustrating details of the encoder 265. The encoder 265 includes data portion selector 305, a target area locator 310, an analyzer 315, a signature writer 320, an encryptor 325 and a marker 330.

The data portion selector 305 selects a portion of the unencoded data 155 for marking. For digital still image data, the data portion selector 305 preferably selects the bitmap for each color (e.g., each of RGB, each of CMYK, each of grayscale, or each of another color combination) of an entire frame. For digital movie data, the data portion selector 305 preferably selects each bitmap of each color of each frame. Although bitmaps representing color are being selected herein, it will be appreciated that the data portion selector 310 alternatively or additionally may select the map for intensity or other values. For an audio recording, the data portion selector 305 preferably selects each track of the entire sound frame. If a sound frame is too long, the sound frame may be broken into smaller frames. For a continuous audio or video transmission, the transmission must be broken into predetermined blocks or frames. It will be further appreciated that the data portion selector 305 may select multiple image frames, multiple audio frames, etc. or combinations thereof The target area locator 310 searches each selected portion for a "flat" target area where a content-identifying mark can be placed. The target area locator 310 preferably searches the selected portion in a predetermined order, e.g., starting from the upper left pixel and moving rightward across the row and downward through the rows. For a digital still image, the target area locator 310 searches for a segment of pixels, wherein each pixel in the segment is represented by a data value, e.g., color value, which varies no more than a particular amount relative to the other pixels in the segment. For example, for a gray-scale image, the target area locator 310 searches the gray-scale bitmap for a segment where each pixel has a gray value within a particular range of the other pixels in the segment. In a real life image, this segment may be found, for example, in a skyline, in a tree, in the body of an automobile, or in another relatively constant color surface. For an audio recording, the target area locator 310 searches the frame track for a segment of sound samples, where each sound sample in the segment is represented by a data value, e.g., volume, that varies no more than a particular amount relative to the other sound samples in the segment. In a real life audio recording, the segment may be found, for example, in a bass guitar, in a voice, in a quiet pause, or in another relatively uniform sound. It will be appreciated that the length of the segment need only be as long as the mark, e.g., fifty-two (52) pixels.

The target area locator 310 attempts to find a flat area with the least amount of variance. That is, the target area locator 310 searches the selected portion for a segment having data values where no bits change between the words. If the target area locator 310 does riot locate an area satisfying this criterion, the target area locator 310 searches the selected portion for a target area having data values where, at most, the least significant bit changes between data values, but no other bits change. Again, if the target area locator 310 does not locate an area satisfying this criterion, the target area locator 310 searches the selected portion for a target area having data values where, at most, the least two significant bits change, but no other bits change. The target area locator 310 repeats this process until an area is found where, at most, all bits but the most significant bit in the data values of the segment change. The "flatness value" represents the depth necessary to locate unchanging bits. Accordingly, the flatness value can be computed as the number of changing bits plus one (1). It will be appreciated that the target area locator 310 may search for a flat area, which has a set flatness value, for example, of six (6) bits.

If the target area locator 310 does not find an area that satisfies one of these tests, then using the techniques of this invention to mark the file is not possible. However, real life data will almost always have a flat target area. The mathematics of locating a flat target area are described in greater detail below with reference to FIGS. 7A through 7C. It will be appreciated that the target area locator 310 attempts to find a target area having the least variance so that the mark goes as unnoticed as possible. Accordingly, the mark will be quite subtle if displayed in its marked state.

The analyzer 315 computes a content-identifying value for the unaltered original data of the selected portion. For example, the analyzer 315 may determine a checksum, limited to a predetermined number of bits such as twenty-four (24), for the selected portion. Alternatively, the analyzer 315 may perform predetermined hashing functions on random or all the data in the selected portion to compute the content-identifying value. The content-identifying value will be used to verify the authenticity of test data. Thus, the analyzer 315 should use an algorithm that is based on the content and that provides a sufficient amount of uniqueness to recognize altered data.

The signature writer 320 enables the manufacturer of digital input devices 200 to append a signature identifying the company, product line or version number to the mark for encoding. Like other elements described herein, the signature writer 320 is optional.

The encryptor 325 enables the encryption of the content-identifying value for added security. The manufacturer may determine whether to use encryption and, if so, which encryption algorithm to use. Again, like other elements described herein, the encryptor 325 is optional.

Figure 6:
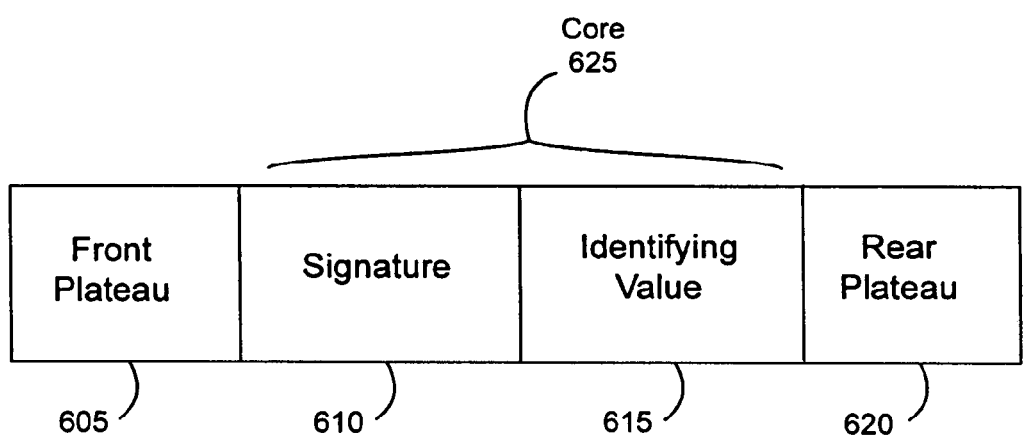
FIG. 6 is a block diagram illustrating details of a mark.

The marker 330 encodes the mark into the flat target area located by the target area locator 310. As shown in FIG. 6, a mark 600 includes a front plateau 605, the optional signature 610 generated by the signature writer 320, the content-identifying value 615 computed by the analyzer 315, and a rear plateau 620. The portion of the mark containing actual content is referred to herein as the "core" 625. In this case, the core 625 includes the data between the front plateau 605 and the rear plateau 620. It will be appreciated that the regions in the core 625 can have any order, so long as the decoder 270 knows the order. In this example, the front plateau 605 and rear plateau 620 are used as a beacon to enable finding the marked area for subsequent decoding, as described with reference to FIG. 4 and FIGS. 10A through 10C. Based on the sizes of each region 605, 610, 615 and 620 set by the manufacturer, the size of the mark 600 can be determined. For example, the front plateau 605 may be ten (10) bits, the signature 610 may be sixteen (16) bits, the content-identifying value 615 may be sixteen (16) bits, and the rear plateau may be ten (10) bits, thereby creating a mark 600 fifty-two (52) bits long.

An example of encoding a mark 600 into a target area is illustrated and described with reference to FIGS. 7A through 7c. Generally, to represent a one (1) bit in the core 625, the marker 330 inverts the varying least-significant bits and the next constant bit of the attribute value corresponding to the core bit. To represent a zero (0), no bits are changed. Since the bits representing a one (1) no longer satisfy the flatness criteria, the core bits can be determined easily and the data can be returned to their original state easily. One skilled in the art will also recognize that you can invert the meaning of encoding for a 0 bit and a 1 bit as well. Inverting the encoding method or meaning of 0 and 1 is optional.

Figure 4:
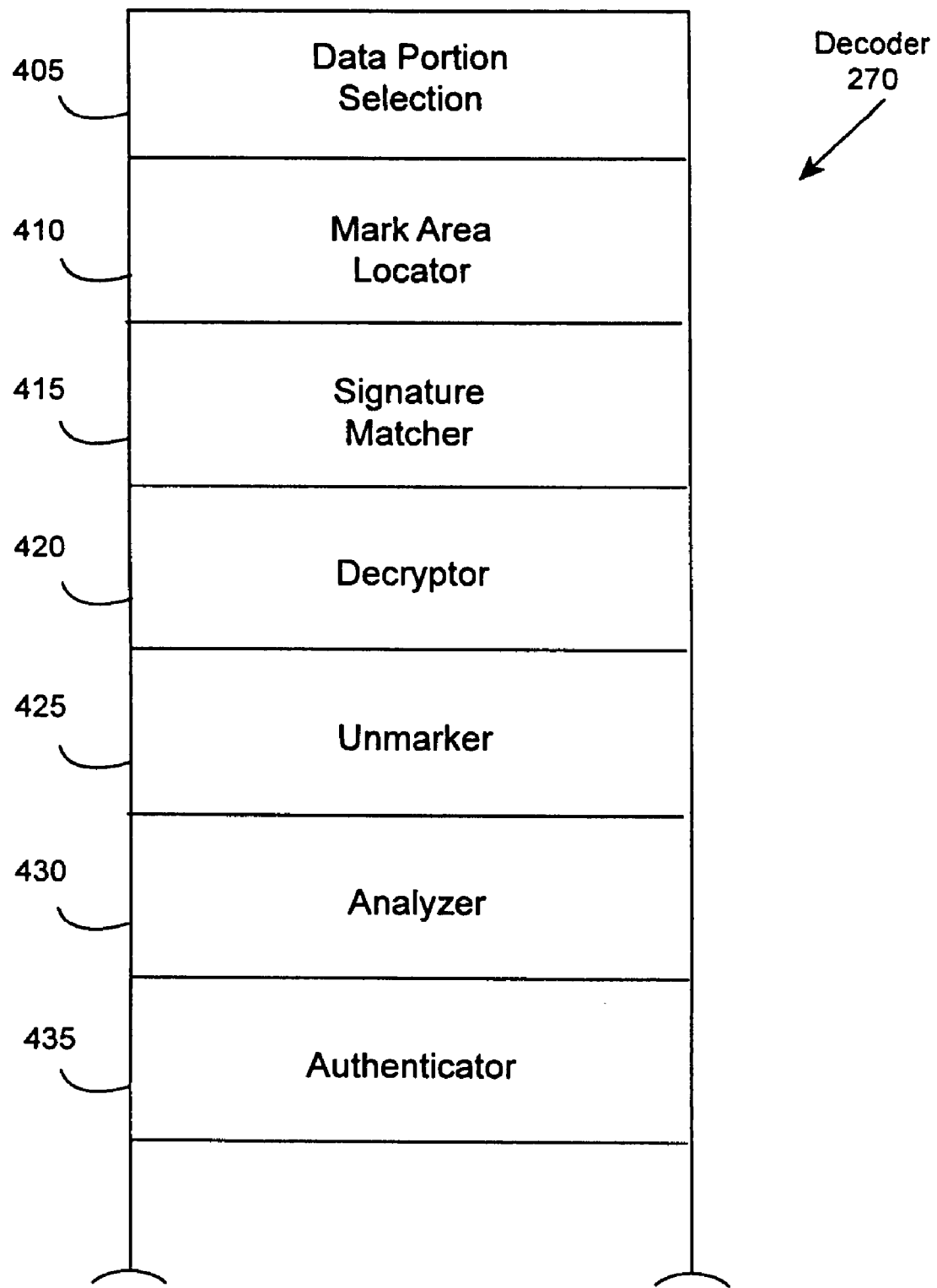
FIG. 4 is a block diagram illustrating details of the decoder of FIG. 2B.

FIG. 4 is a block diagram illustrating details the decoder 270. The decoder 270 includes a data portion selector 405, a mark area locator 410, a signature matcher 415, a decryptor 420, an unmarker 425, an analyzer 430 and an authenticator 435. The data portion selector 405 performs the same data portion selection algorithm as the data portion selector 305 of the encoder 265.

The mark area locator 410 searches the selected portion in the same order as the target area locator 310. Knowing the length of each plateau 605 and 620 and the length of the core 625, the mark area locator 410 searches for flat areas in segments where a front plateau 605 and a rear plateau 620 could be and ignores the segment where a core 625 would be. If, for example, all front plateaus 605 and rear plateaus are each ten (10) bits long and all cores 625 are thirty-two (32) bits long, then the mark area locator 410 searches the selected portion for two sets often (10) data values that satisfy the flatness criteria and that are separated by thirty-two (32) data values. If so, then the mark area locator 410 selects the area as a candidate, or possible, mark area. If not, then the mark area locator 410 cannot verify the authenticity of the selected portion. It will be appreciated that a mark 600 may include only a single plateau, e.g., a front plateau 605, a rear plateau 620 or a middle plateau. Knowing the length of the core 625, the mark area locator 410 need only locate the plateau. It will be further appreciated that a mark 600 need not include a plateau at all. The mark area locator 410 can search a given location for a mark. However, because flatness is being assumed at this given location, this embodiment will likely fail an undesirable percentage of times.

As with the target area locator 310, the mark area locator 410 searches the selected portion for a flat area having no changing bits between data values, then for a flat area having only one changing bit between data values, etc., until either a flat area is found or until it is determined that the most significant bit of each attribute value is also not constant. As stated above, since the flatness value represents the depth necessary to locate the unchanging bits, the flatness value can be computed as the number of changing bits plus one (I). It will be appreciated that, if the flatness value is a preset number, then the mark area locator 410 will search for a flat area of the preset flatness value.

If the mark area locator 410 locates a candidate mark area, then the unmarker 425 attempts to extract the core 625 and to replace it with the assumably original unmarked data. First, the unmarker 425 tries to reconstruct the core 625 one bit at a time. The unmarker 425 uses the same flatness value that the mark area locator 410 needed to find the front and rear plateaus 605, 620. The unmarker 425 retrieves anyone of the data values in a plateau region 605,620, and retrieves the first attribute value that maps to the first core bit. The unmarker 425 compares the absolute difference between the plateau attribute value and the core-corresponding attribute value, and compares the absolute difference between the plateau-corresponding attribute value and the core-corresponding attribute value having the n least-significant bits inverted. If the difference computed with the inverted bits is greater than the difference with the un-inverted bits, then the unmarker 425 assumes the core bit is a zero. If the difference computed with the inverted bits is smaller than the difference with the un-inverted bits, then the unmarker 425 assumes the core bit is a one.

This is conceptually simpler than it seems. Since the target area was originally deemed flat, an un-inverted attribute value should vary less than an inverted value. Further, any attribute value in a plateau region 605, 620 is, by definition, an un-inverted value. As a practical matter, the unmarker 425 performs the comparison of every core-corresponding attribute value against the same plateau-corresponding attribute value. The unmarker 425 then performs its operations for each core-corresponding attribute value, building the core 625 bit by bit.

Second, after the unmarker 425 determines the core 625 based on the candidate mark area, the unmarker 425 can use the core 625 to return the candidate mark area back to its assumably original state. The unmarker 425 merely inverts the bits, up to the depth represented by the flatness value, for the data values corresponding to one core bits.

After the unmarker 425 extracts the core 625, the signature matcher 415 can recognize whether the signature in the extracted core 625 matches the signature originally embedded. If the signature matcher 415 fails to match the signatures, the signature matcher 415 instructs the mark area locator 410 to search for another possible mark 600. Again, like many elements of the system 100, the signature matcher 415 is optional.

After the unmarker 425 extracts the core 625, the decryptor 420 can decrypt whatever core data was originally encrypted, e.g., the entire core 625 or just the identifying value 615. Again, like many elements of the system 100, the decryptor 420 is also optional.

After the unmarker 425 returns the data in the selected portion back to its assumably original state, the analyzer 430 performs the same algorithm as the analyzer 315 to compute the content-identifying value for the assumably original data of the selected portion.

The authenticator 435 compares the content-identifying value in the candidate mark 600 against the content-identifying value computed from the assumably original data. If the values match, then the authenticator 435 determines, with a certain level of confidence, that the assumably original data includes only original data. The level of confidence is related to the algorithm used to compute the content-identifying value. For example, if a checksum limited to twenty-four (24) bits were used, then the level of confidence would be 1 in a 2 chance. If the values do not match, then the authenticator 435 instructs the mark area locator 410 to search for another possible mark area. If the selected portion has been searched in its entirety, the mark area locator 410 cannot authenticate the selected portion.

Figure 5B:
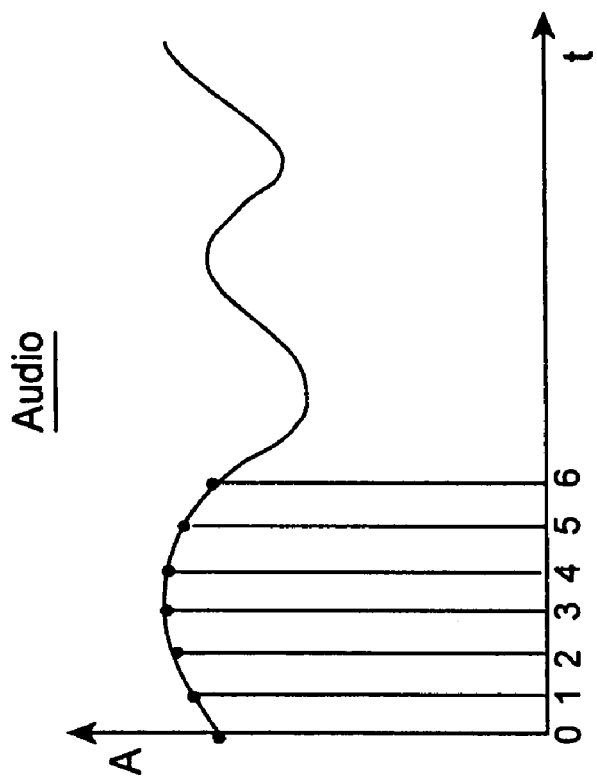
FIG. 5B is a graph illustrating an audio bitmap for a sound frame.
Figure 5A:
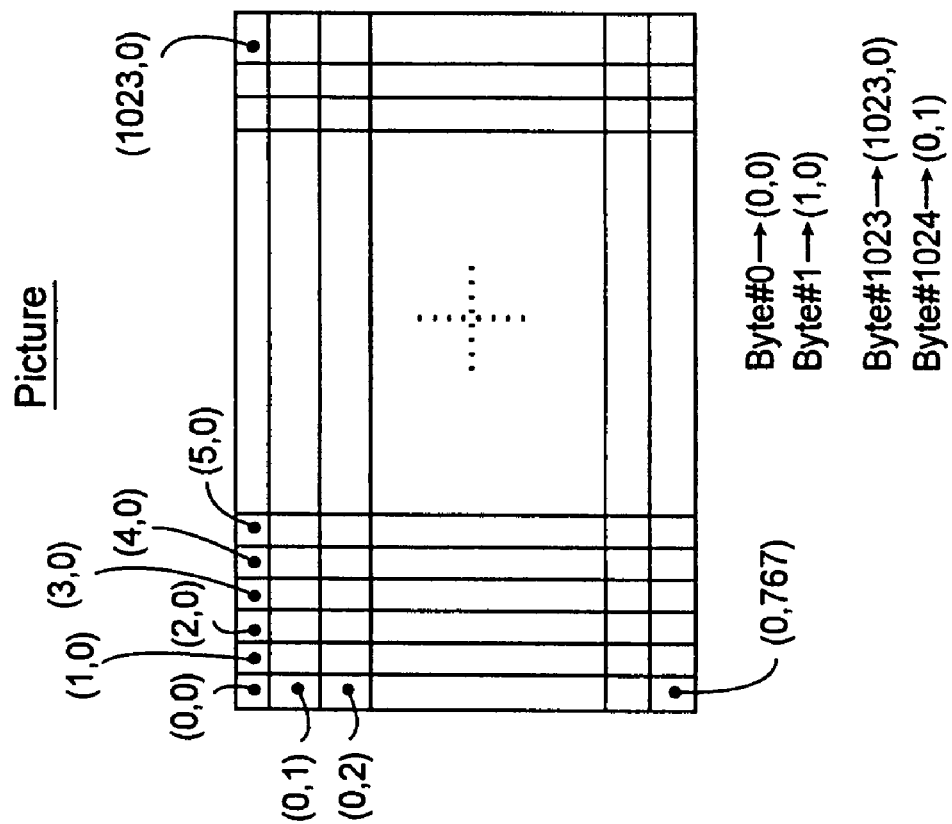
FIG. 5A is a block diagram illustrating an image bitmap for picture.

FIG. 5A illustrates an example 1024 by 768 digital image bitmap 500. Bitmap 500 includes first row having pixel #0 at location (0,0), pixel #1 at location (1,0), pixel #2 at location (2,0), etc.; and a second row having pixel #1024 at location (0,1), pixel #1025 at location (1,1), pixel #1026 at location (2,1), etc. Each pixel is represented by a data value (e.g., one byte).

FIG. 5B illustrates an example digital audio wave, having sampled data at time zero, one, two, etc. Each digital sample is represented by a data value (e.g., one byte).

Figure 7:
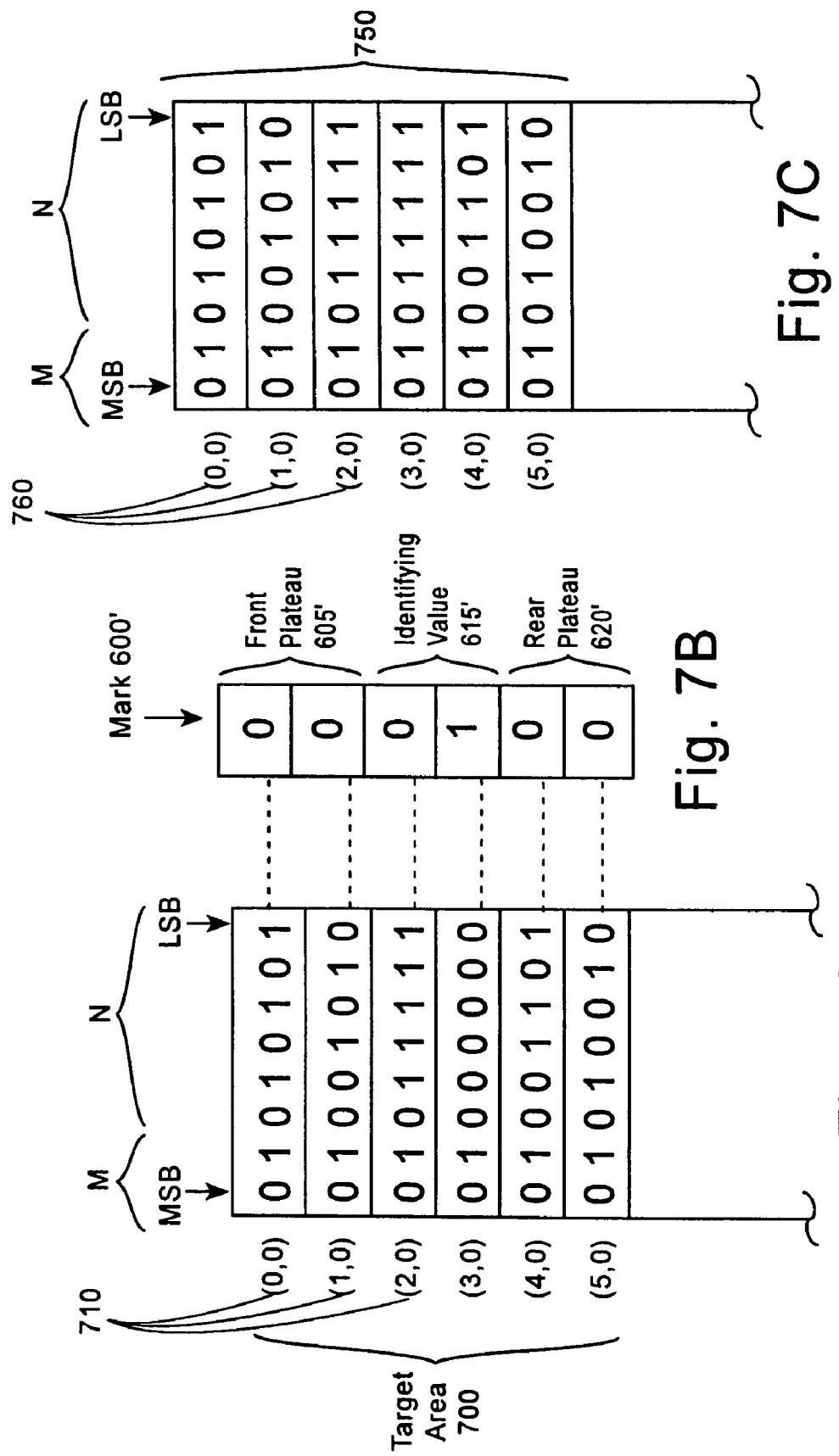
FIG. 7A illustrates an example target area.
FIG. 7B illustrates an example mark.
FIG. 7C illustrates the target area of FIG. 7A encoded with the mark of FIG. 7B.

FIG. 7A illustrates an example of a target area 700. Target area 700 includes six (6) data values 710, wherein each attribute value 710 represents a color value for each pixel of pixels (0,0) through (5,0). The example color values for these pixels are 01010101,01001010,01011111,01000000,01001101 and 01010010.

The target area locator 310 examines each of these data values 710 to determine that the sixth, seventh and eighth bits for each value. 710 are constant. That is, the target area locator 310 determines that the target area 700 has a flatness value of six (6) or is flat at a depth of six (6) bits. For this example, it is assumed that there are no areas in the file which have a variance of less than six (6) bits. Accordingly, the target area locator 310 sets the flatness value (n) to six (6) and a value (m) identifying the remaining bits to two (2).

FIG. 7B illustrates an example mark 600'. The mark 600' includes six (6) bits, namely, 000100, wherein each bit will be embedded into one of the data values 710. The mark 600' includes a two (2) bit front plateau 605' (00), a two (2) bit identifying value 615' (01), and a two (2) bit rear plateau 620' (00). In this instance, the core 625 is two (2) bits. The front plateau 605 and rear plateau 620 are preferably all zeros, so that no changes are made to the data values 710 corresponding to the plateau regions 605, 620 and so that the plateau regions 605, 620 can be found again easily.

FIG. 7C illustrates the example mark 600' embedded into the example target area 700'. The resulting area 750 still includes six (6) marked data values 760. For each one bit in mark 600', the marker 330 inverted the n least-significant bits. That is, since only the second bit of the identifying value 615' is high, the marker 330 inverted the six (6) least significant bits of only the fourth attribute value 710, from 01000000 to 01111111. The other data values 710 remain the same.

Figure 8:
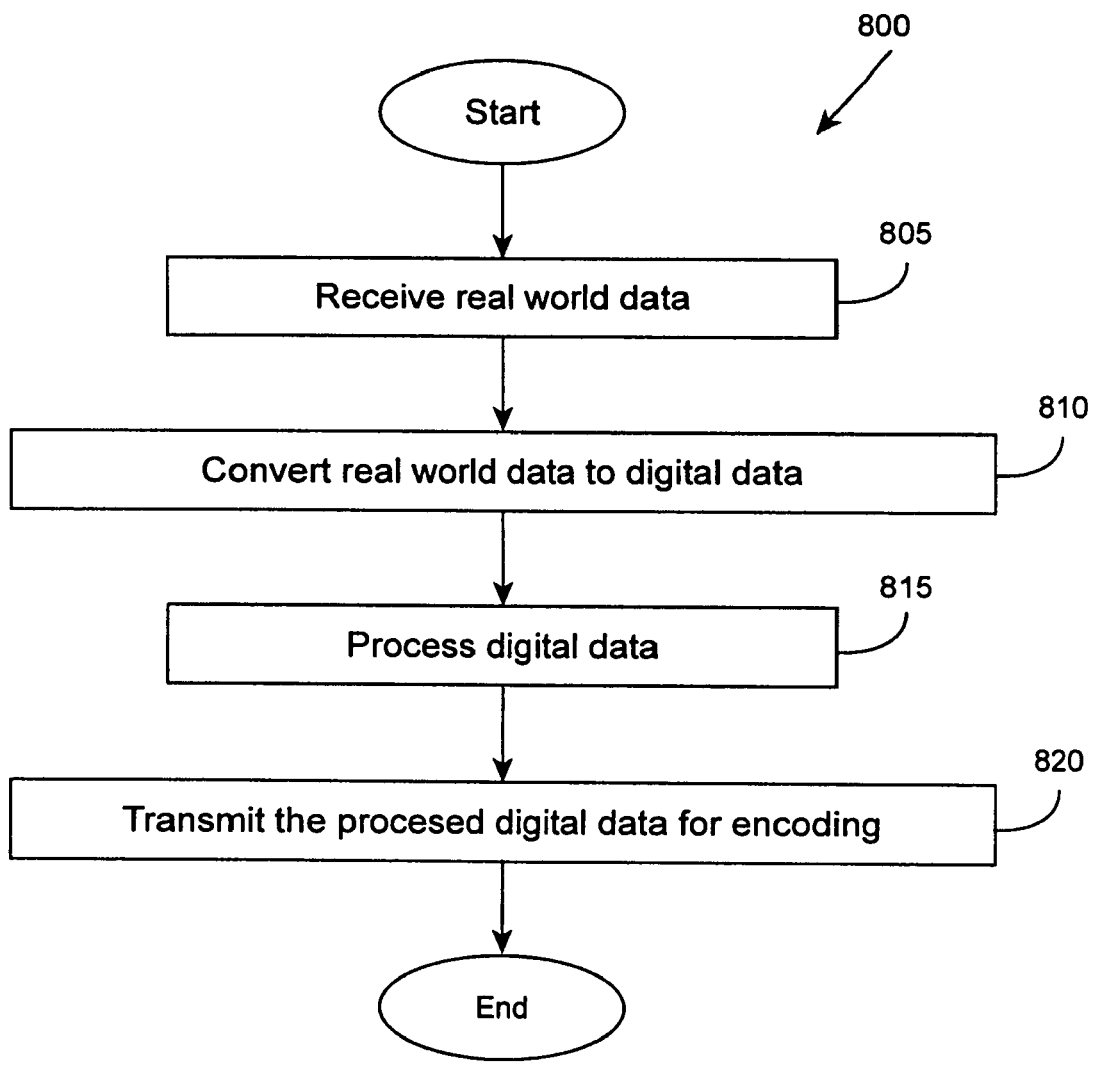
FIG. 8 is a flowchart illustrating a method of obtaining real world data.

FIG. 8 is a flowchart illustrating an example method 800 of obtaining unencoded data 155. Method 800 begins with the raw data receiver 205 of the digital input device 200 in step 805 receiving real world data and in step 810 converting the real world data to digital data. The raw data processor 210 of the digital input device 200 in step 815 processes the digital data. The processed data transmitter 215 of the digital input device 200 in step 820 transmits the processed digital data to the encoder 265 for encoding. Method 800 then ends.

Figure 9A:
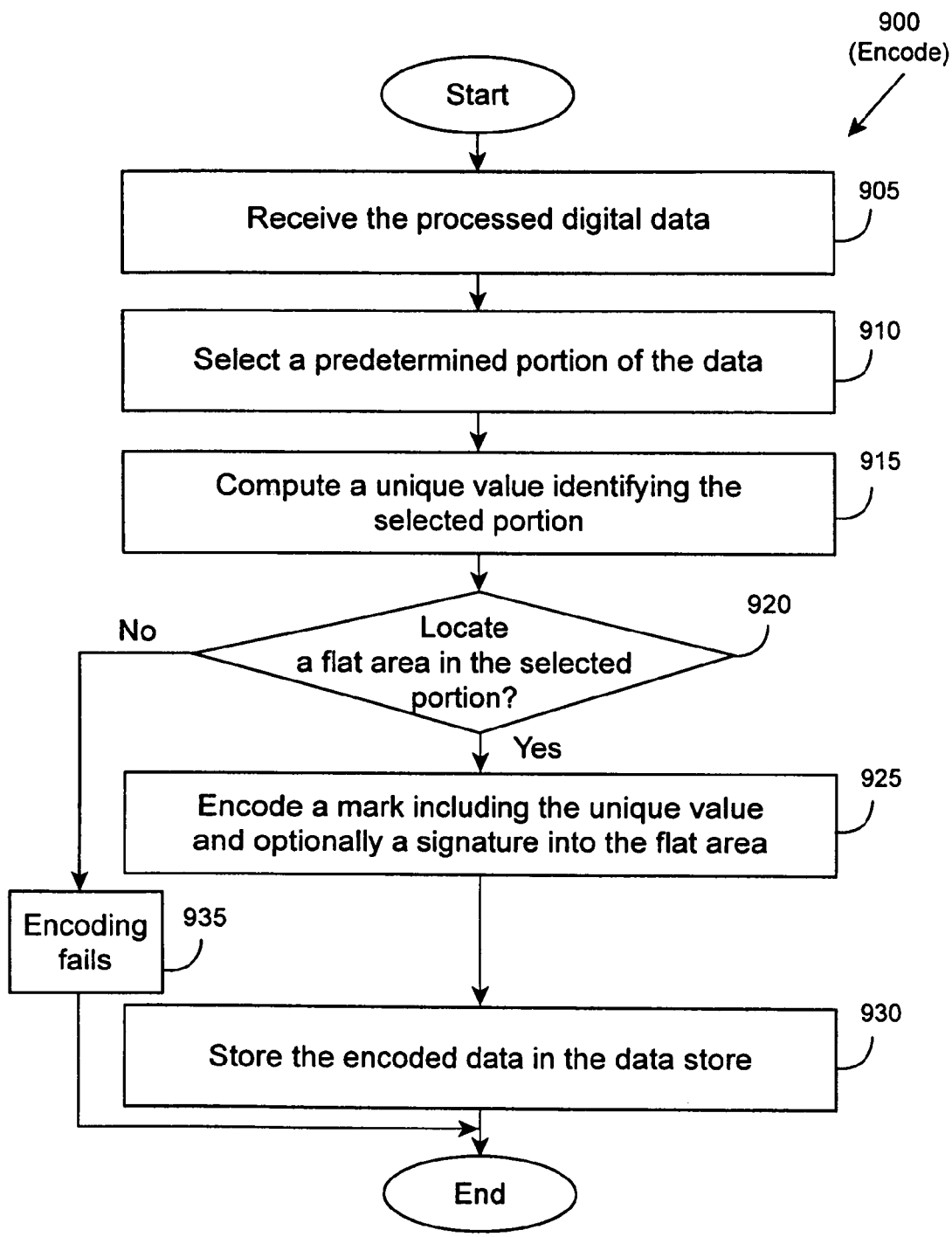
FIG. 9A is a flowchart illustrating a method of encoding a digital file with a mark, in accordance with the invention.

FIG. 9A is a flowchart illustrating a method 900 of encoding unencoded digital data 155. Method 900 begins with the data receiver 240 in step 905 receiving the unencoded digital data 155. The data portion selector 305 in step 910 selects a predetermined portion of the unencoded digital data 155. As stated above, the data portion selector 305 may select an entire image frame, a single color of an entire image frame, a single track of a sound frame, or portions, multiples or combinations thereof. The decoder 270 need only know the algorithm used by the encoder 265 to select the same portion. The analyzer 315 in step 915 computes a substantially unique content-identifying value, such as a checksum limited to a predetermined number of bits, to identify the selected portion.

The target area locator 310 in step 920 uses a predetermined algorithm to attempt to locate a flat area in the selected portion. The predetermined algorithm typically includes searching from a starting point in the selected portion along a predetermined path to an ending point in the selected portion for the first region that contains the least-varying segment of a predetermined size. The predetermined size is based on the size of the mark 600 to be embedded into the target area. The most significant bit of the segment cannot vary, else the encoding algorithm fails. However, real life data will rarely ever fail. If the target area locator 310 in step 920 fails to locate a flat area, then the encoder 265 in step 935 fails and method 900 ends. If the target area locator 310 in step 920 locates a flat area, then method 900 proceeds to step 925.

In step 925, the marker 330 encodes a mark; which includes a front plateau 605, an optional signature 610, the unique content-identifying value 615 and a rear plateau 620 into the flat target area. The step of encoding a mark 600 into a flat area is described in greater detail with reference to FIG. 3 and FIGS. 7A through 7C. The data receiver 240 in step 930 stores the encoded data 260 into the data store 235. Method 900 then ends.

Figure 9B:
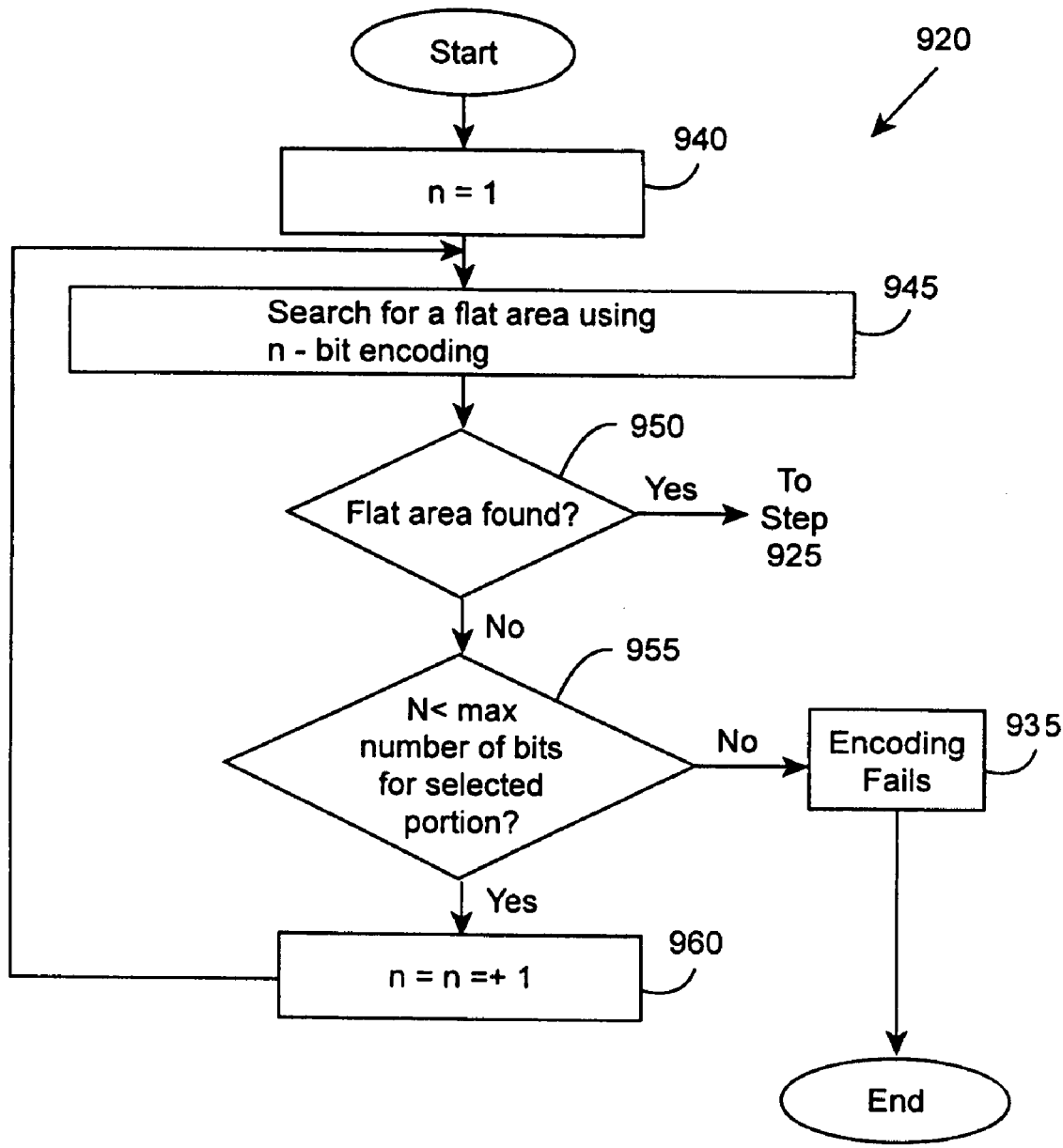
FIG. 9B is a flowchart illustrating details of the step of locating a flat target area of FIG. 9A.

FIG. 9B is a flowchart illustrating details of step 920, as a method 920. Method 920 begins with the target area locator 310 in step 940 setting the value n equal to one (1). The value n represents the flatness value, i.e., the number of bits in the flat area that can change between data values plus one (1) and the number of bits to be inverted to represent a one core bit. The target area locator 310 in step 945 searches for a flat area using n-bit encoding, i.e., where n−1 least significant bits between data values in a segment do not change. For n equal to one (1), the target area locator 310 searches for an area where no bits between data values in the segment change. This can be found in some constant color surfaces. Accordingly, inverting only the least significant bit can be detected and will represent a one bit value. No change in the least significant bit will represent a zero bit value.

In step 950, the target area locator 310 determines whether it found a flat area using the current flatness value n. If so, the target area locator 310 proceeds to step 925 of FIG. 9A. If not, then the target area locator 310 in step 955 determines whether the flatness value n is less than a maximum number of bits for the attribute value of the selected portion. For example, if the number of bits representing color is eight (8) bits, then the target area locator 310 determines whether the flatness value n is less than eight (8). If so, then the target area locator 310 in step 960 increments the flatness value n and returns to step 945. Otherwise, i.e., if the flatness value n equals eight (8), then the target area locator 310 in step 935 determines that no flat area exists and that encoding using these techniques fails. Method 920 then ends.

Figure 10A:
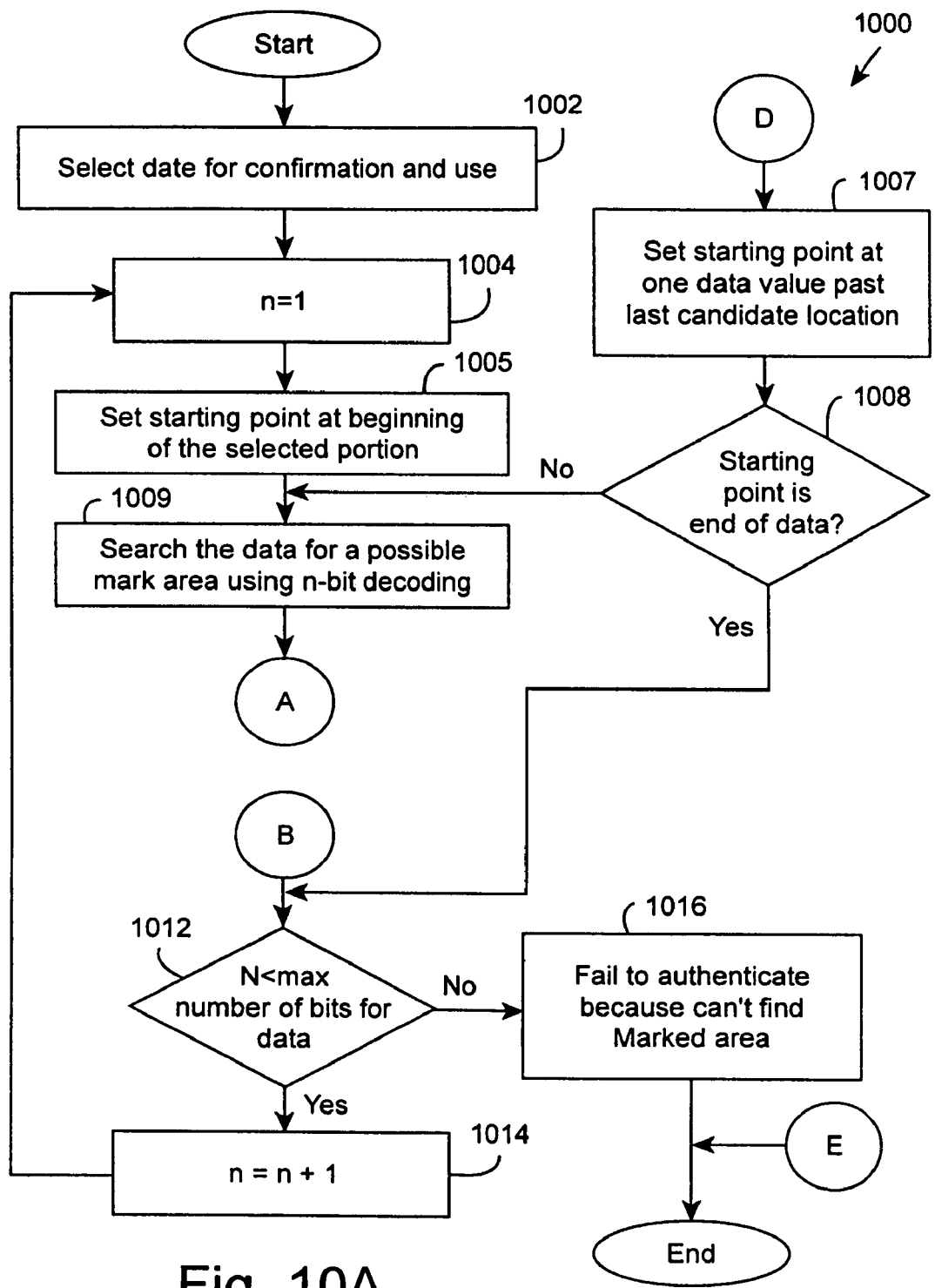
FIGS. 10A through 10C are a flowchart illustrating a method of decoding a digital file, in accordance with the invention.
Figure 10B:
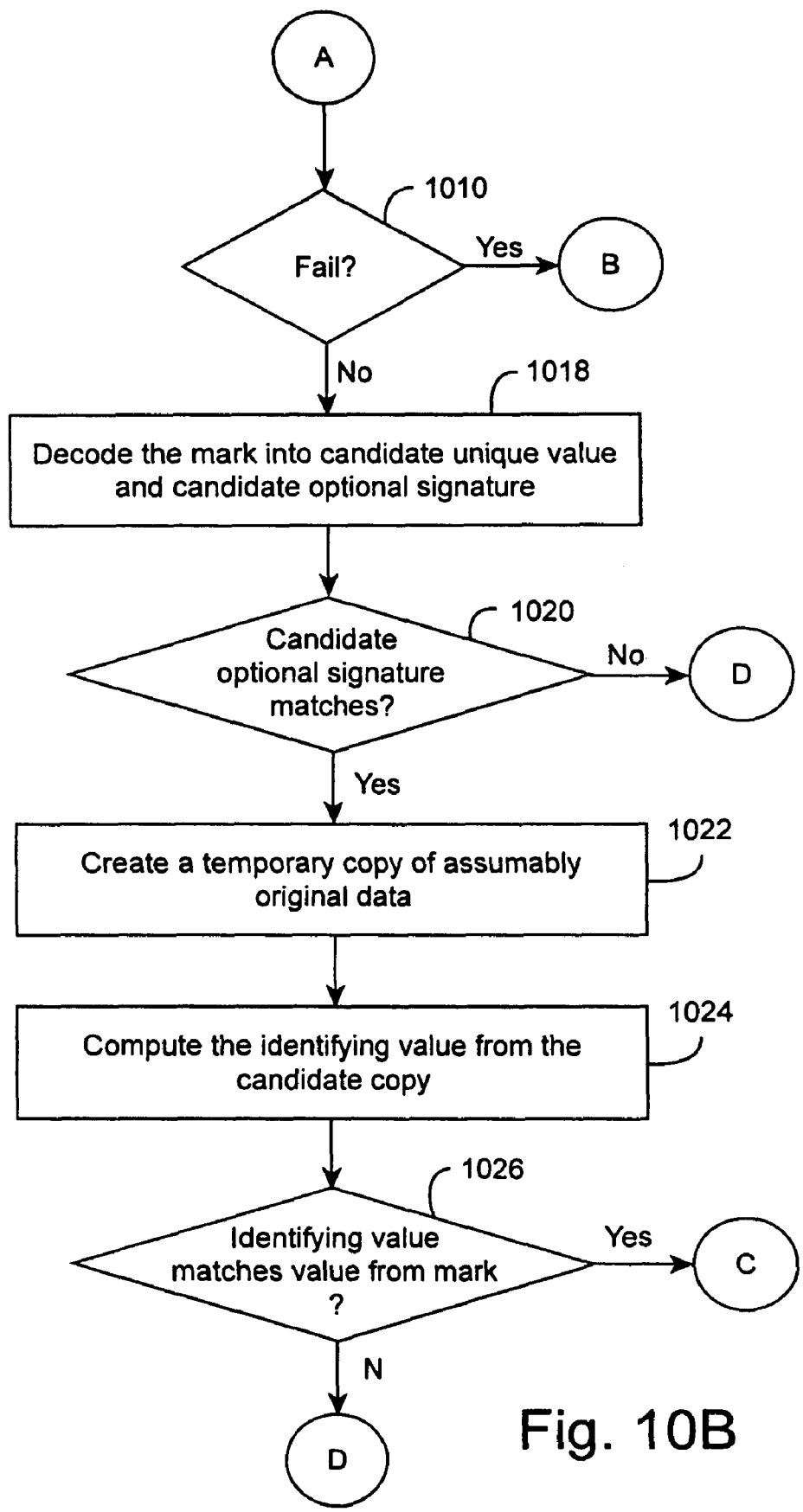
Figure 10C:
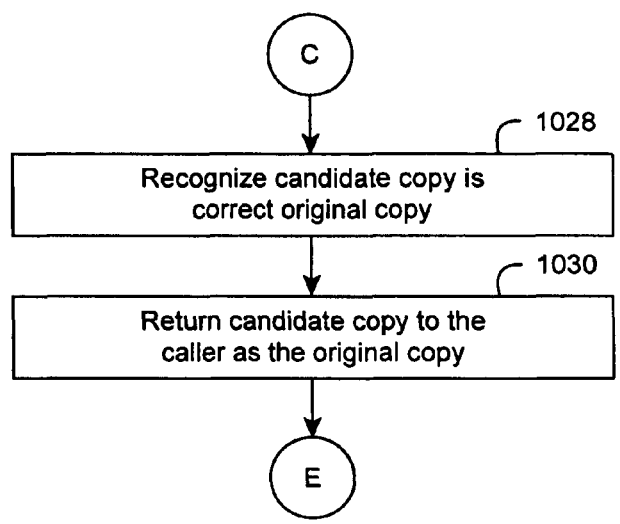

FIGS. 10A through 10C are a flowchart illustrating a method 1000 of decoding test data. Method 1000 begins with the data portion selector 405 in step 1002 receiving and selecting data for authentication and, possibly, use. For proper authentication, the data portion selector 405 must select the same data portion as selected by the data portion selector 305 of the encoder 265. The mark area locator 410 in step 1004 sets the flatness value n equal to one (1), and in step 1005 sets the starting point of the search at the beginning of the selected portion. The mark area locator 410 in step 1009 searches the selected portion from the starting point towards the end of the data for a possible decode area using n-bit decoding. That is, the mark area locator 410 searches the selected portion for bytes that have n−1 changing bits at locations where a front plateau 605 and rear plateau 620 could be located. The mark area locator 410 in step 1010 determines whether it failed. If the mark area locator 410 fails to find a possible mark area, then method 1000 proceeds to step 1012. If the mark area locator 410 finds a possible mark area, then method 1000 proceeds to step 1018.

In step 1012, the mark area locator 410 determines whether the flatness value n is less than the maximum number of bits for the data values of the selected portion. As stated above, if the data values are represented by eight (8) bits, then the maximum number is eight (8). If the flatness value n is less than the maximum number, then the mark area locator 410 in step 1014 increments the flatness value n, and returns to step 1005. If the flatness value n equals the maximum number, then the mark area locator 410 determines that it failed to find a possible mark area, and method 1000 ends.

In step 1018, the unmarker 425 decodes the candidate mark, which includes the candidate unique content-identifying value and the candidate optional signature. Decoding the candidate mark includes comparing a data value from either plateau region 605,620 against each attribute value in the core 625 of the possible mark area and against its n-bit inverted value. If the difference between the n-bit inverted value and the plateau-corresponding attribute value is greater than the difference between the un-inverted value and the plateau-corresponding attribute value, then the unmarker 425 determines that the core bit is a zero (0). If the difference between the n-bit inverted value and the plateau-corresponding attribute value is smaller than the difference between the un-inverted value and the plateau-corresponding attribute value, then the unmarker 425 determines that the core bit is a one (1).

The signature matcher 415 in step 1020 determines whether the decoded signature is the same as the originally embedded signature. If not, then method 1000 proceeds to step 1007. In step 1007, the mark area locator 410 sets the starting point at one data value past the last candidate location, and in step 1008 determines whether the starting point is past the end of the data portion. If so, then method 1000 proceeds to step 1012. Otherwise, method 1000 proceeds to step 1009.

If the signature is the same as the originally embedded signature, then the unmarker 425 in step 1022 creates a temporary copy of the assumably original data, by inverting the least significant n-bits of each attribute value which corresponds to a one core bit. The analyzer 430 in step 1024 uses the same algorithm as the analyzer 315 of the encoder 265 to compute a unique content-identifying value for the candidate copy. The authenticator 435 in step 1026 determines whether the computed content-identifying value is the same as the decoded content-identifying value from the candidate core 625. If not, then method 1000 returns to step 1007. Otherwise, method 1000 proceeds to step 1028.

In step 1028, the authenticator 435 recognizes that the candidate copy is the correct original copy, to a level of confidence equivalent of the algorithm used to compute the unique content-identifying value. The authenticator 435 in step 1030 returns the candidate data to the caller as the original data. Method 1000 then ends.

To illustrate a program embodying the present invention, a header file AUTH.H is provided in Appendix A, and a C++ source file AUTH.CPP is provided in Appendix B. Appendix A and Appendix B are both hereby incorporated by reference herein. The header file and source file together demonstrate a system and method for encoding a mark containing a content-identifying value into a flat area in digital data. The header file and source file together also demonstrate a system and method for decoding a mark containing a content-identifying value in digital data.

In addition to the above embodiments, several other embodiments are also possible and capable of being implemented in light of the teachings above. These additional embodiments can add to the retrieval of an embedded message even after lossy compression. However, one skilled in the art will recognize that lossy compression will change the values, and thus would change an embedded content-identifying value.

First, the above embodiments have been described with reference to finding a flat area to embed a message within a series of binary numbers. In a different embodiment, the target area locator 310 locates a flat area within a series of decimal numbers to embed a mark 600. For example, the series of numbers "120, 121, 123, 131, 134, 131, 131, 118 . . . " may be deemed a flat area. A low value or a 0 bit may be represented as the number unchanged. A high value or a 1 bit may be represented as the number modified by some recognizable amount, e.g., by adding 40. To determine the state of a value, the marker 330 and unmarker 425 can set a reference half the recognizable amount from the average low value. For the above series, the average value is about 126. Therefore, the reference can be set about 20 (i.e., about ½ of 40) away from 126, for example, to 146. The marker 330 and unmarker 425 can define any values below 146 as low values and any values above 146 as high values. One skilled in the art will recognize that the states can be reversed. Further, the unmarker 425 can subtract the recognizable amount from the high values to obtain the original values. It will be appreciated that, if the original values change due to lossy compression, the reference will follow the values.

Second, the above embodiments have been described with reference to finding a flat area within a consecutive series of numbers to embed a mark 600. In a different embodiment, the target area locator 310 can locate a flat area of any predetermined pattern to embed the mark 600. The pattern may be based on a function (such as every other number) or on an irregular pattern (such as the first number, the eighth number, the twelfth number, etc.). The pattern may be one-dimensional, two-dimensional or three-dimensional. So long as the pattern is known, the flat area can be located repeatedly. In another similar embodiment, the target area locator 310 may have multiple predetermined fixed patterns and may go through the patterns to find the most promising flat area. It will be appreciated that, when using a predetermined pattern to locate a flat region, plateau region(s) may be unnecessary. However, plateau regions may be preferred to determine the best reference for gauging low and high values.

Third, since lossy compression may cause the original values containing a mark 600 to change, the difference between low and high values may no longer be the recognizable amount. For example, an original low embedded value of 120 after lossy compression may be at 110, and an original embedded high value of 160 after lossy compression may be at 140. The original recognizable amount was 40 and is now 30. Accordingly, the marker 330 can place one or more known high values, i.e., peaks, in the core area 625 to provide for dynamic gauging. The unmarker 425 can use the difference between the average of the known low values (e.g., now 110) and the average of the known peaks (e.g., now 140) to determine the new recognizable amount (e.g., now 30) and thus the new reference (e.g., now 110+15=125). The unmarker 425 can subtract the new recognizable amount (e.g., 30) from the high values to obtain the approximate original values after lossy compression.

Fourth, to embed a mark 600 in a video or still image frame, a format conversion engine (not shown) in the encoder 265 can first convert the format of the frame to a YCrCb format, since Y (or luminosity) tends to stay relatively constant after compression and decompression. The target area locator 310 can then locate a flat area in the luminosity values in which to embed the mark 600. The marker 330 can then embed the mark 600 within the flat area, and the format conversion engine can reformat the frame back to its original format. To extract the mark 600, a format conversion engine (not shown) in the decoder 270 can first convert the frame to YCrCb format. The mark area locator 410 can then search the luminosity values for the mark area. Once found, the unmarker 330 can extract the mark 600 from the flat area, can return the luminosity values back to their almost original values. The format conversion engine can then reformat the frame to its original format. Format conversion alone is well known.

Fifth, in another embodiment, the marker 330 represents a single high or low embedded value by multiple data values, e.g., multiple pixels. For example, three low pixel values can represent a low embedded value, and three high pixel values can represent a high embedded value. Thus, if one of the pixel values were to change dramatically after lossy compression, the other two pixel values could balance the change.

Sixth, the above embodiments have been described with reference to searching for a flat area in a frame in its original orientation. However, the mark area locator 410 can rotate the frame circularly (e.g., in 90 degree increments), flip the frame over along a horizontal axis or flip the frame over along a vertical axis, and then search for a target area. It will be appreciated that only the location of the data values may have changed. The image content may have remained the same. The mark area locator 410 can search each of the orientations to locate an embedded mark 600.

Seventh, although the above embodiments have been described with reference to embedding only one copy of a mark 600, the target area locator 310 and marker 330 can embed redundant copies of a mark 600 at multiple locations. It will be appreciated that, if data is cropped, redundant copies provide a better chance of extracting at least one of the marks 600.

Eighth, for an embodiment using a non-consecutive functional pattern of pixels, e.g., every third pixel, in which to embed a value, the mark area locator 410 may ramp up or ramp down the separation between pixels when searching for a mark 600 to account for possible scaling. For example, if an image that contains a mark 600 embedded using a pattern of every third pixel is enlarged, then additional pixels may be added to enlarge the image. Accordingly, if one pixel is added every three pixels, then the mark 600 will be found embedded using a pattern of every fourth pixel. If an image is reduced in size, then pixels may be removed to shrink the image. The mark area locator 410 manipulates the known pattern (i.e., ramp up or ramp down) to attempt mark location. Accordingly, if every third pixel (offset by one) is removed, then the mark area locator 410 would search for the mark 600 embedded in every second pixel.

Ninth, to make an embedded mark 600 less visible when displayed, the target area locator 310 may use a two-dimensional or three-dimensional pattern.

Figure 11:
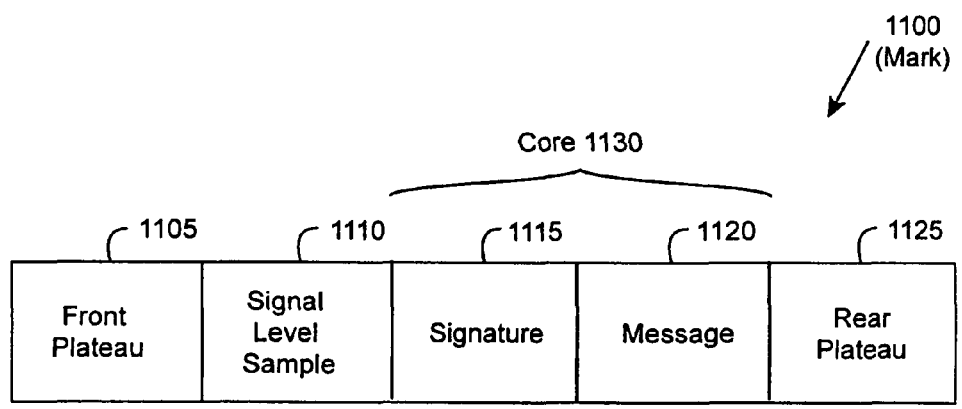
FIG. 11 is a block diagram illustrating details of a mark in an alternative embodiment.

FIG. 11 is a block diagram illustrating an example mark 1100 to be embedded into a flat area of decimal numerals. The example mark 1100 includes a front plateau 1105, a signal level sample 1110, a signature 1115, a message 1120 and a rear plateau. 1125. As stated above, the front plateau 1105 and rear plateau 1125 are used to locate the mark 1100. The core (embedded message) 1130 includes the signature 1115 and message 1120. The signal level sample 1110 includes an embedded low and high value for reference purposes.

Figure 12:
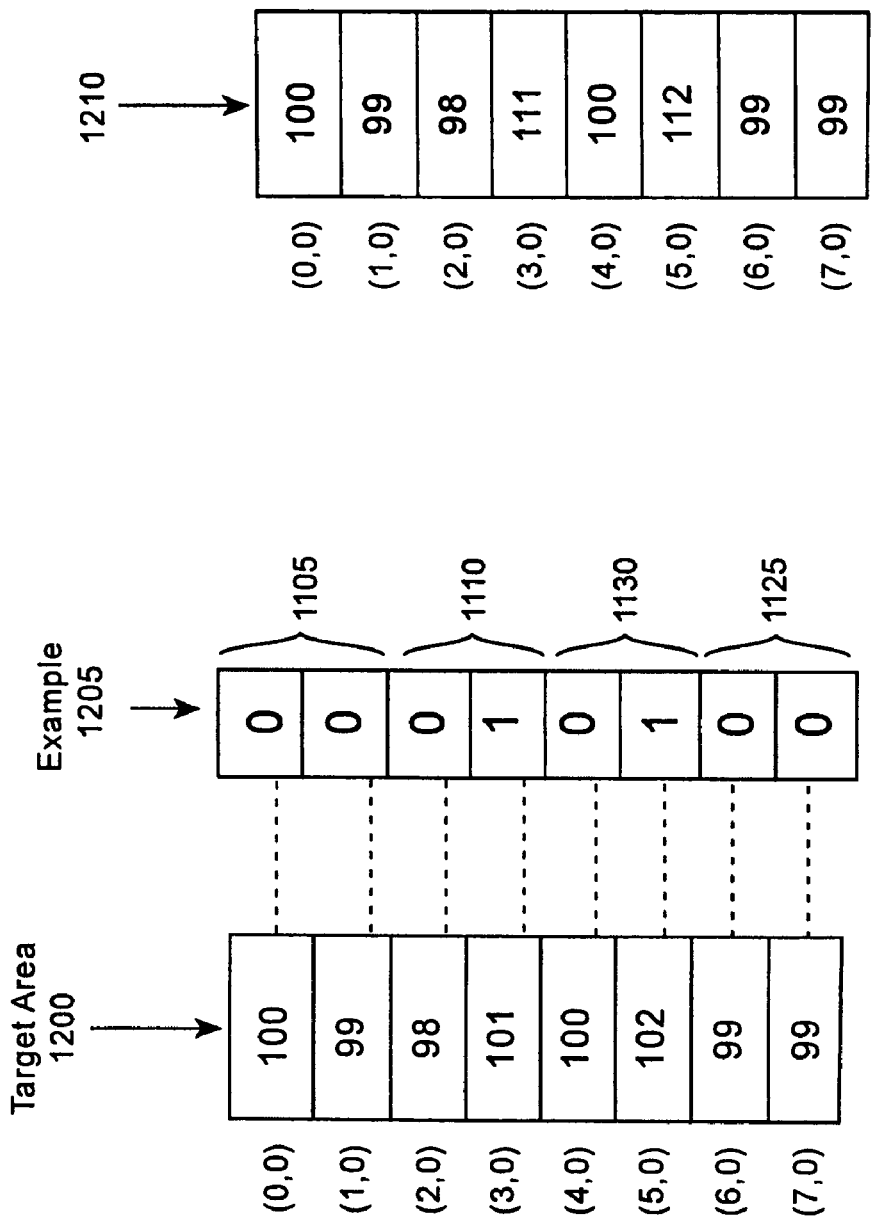
FIG. 12A is a block diagram illustrating an example flat target area.
FIG. 12C is a block diagram illustrating the example flat target area of FIG. 12A containing the example mark of FIG. 12B embedded therein.

FIG. 12A is a block diagram illustrating an example target area 1200, which includes an area eight values wide (for pixels 0,0 to 7,0). The values illustrated include values 100, 99, 98, 101, 100, 102, 99 and 99. The area 1200 has a variance of at most four units.

FIG. 12B is a block diagram illustrating an example mark 1205, which includes eight values. The front plateau 1105 includes the values 0 and 0. To incorporate a known low and high value into the target area 1200, the signal level sample 1110 includes the values 0 and 1. The core 1130 includes the example values 0 and 1. The rear plateau includes the values 0 and 0.

FIG. 12C is a block diagram illustrating the target area 1200 containing the embedded mark 1205, illustrated as values 1210. Since the front plateau 1105 and rear plateau 1125 contain only low values, their values remain unchanged. However, the values being modified to represent a high value have been raised in this embodiment by the recognizable amount often. Accordingly, since it is known that the first three values and last two values are lows and the fourth value is a high, we can approximate the recognizable amount. That is, we compute the average of the known low values, 100, 99, 98, 99 and 99 at 99. We know that 111 represents a high value. Thus, we compute the recognizable amount at 111 minus 99, or 12. Thus, we know any value above 99 plus half of 12, or 105, is a high, and everything less than 105 is a low.

Figure 13:
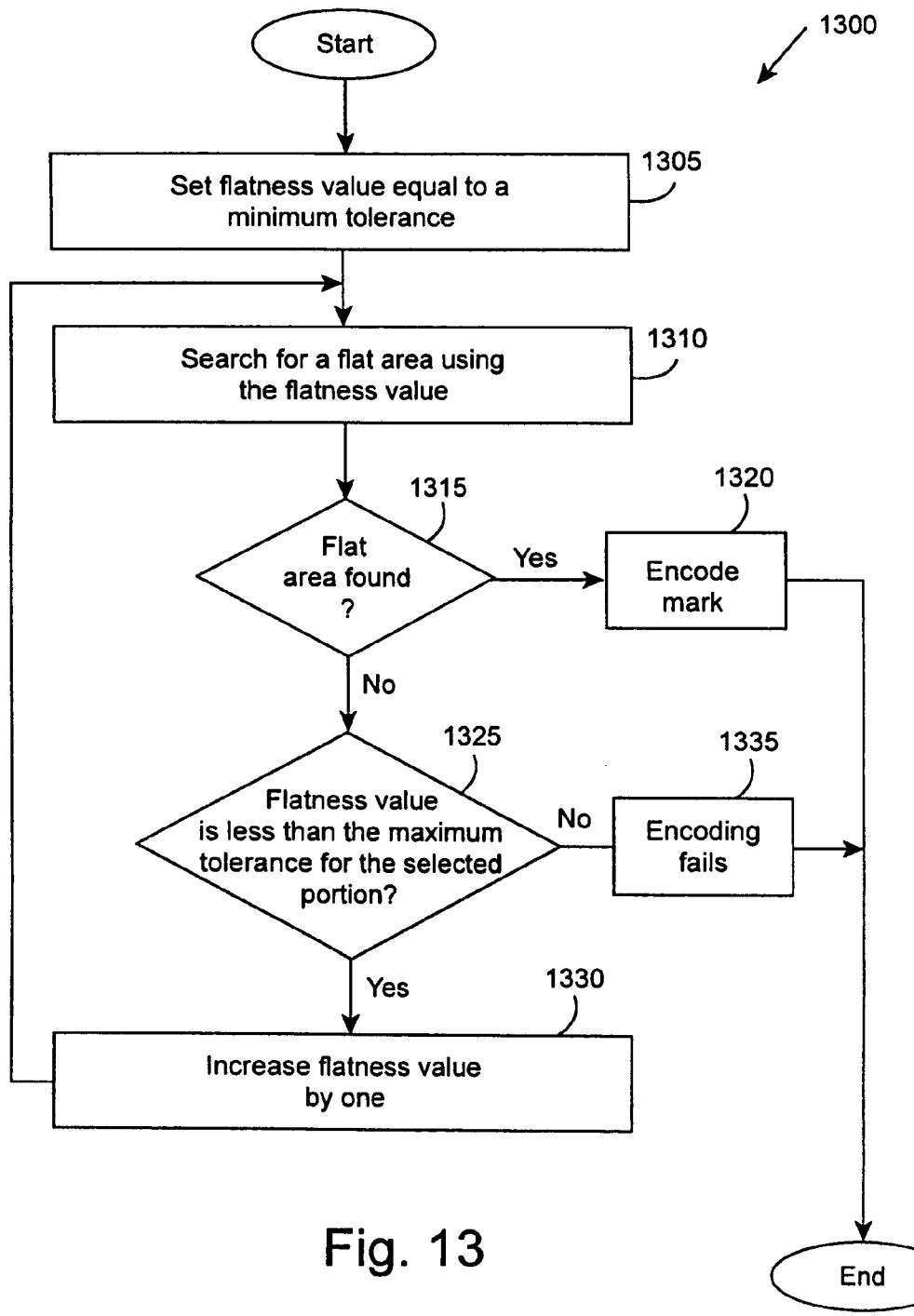
FIG. 13 is a flowchart illustrating a method of locating a flat target area.

FIG. 13 is a flowchart illustrating a method 1300 of locating a flat target area 1200. Method 1300 begins with the target area locator 310 in step 1305 setting a flatness value equal to a minimum tolerance, e.g., three. The target area locator 310 in step 1310 searches for a flat area using the flatness value. If the target area locator 310 in step 1315 locates a flat target area 1200, the marker 330 in step 1320 encodes the mark 1205 and method 1300 ends. If the target area locator 310 in step 1315 does not locate a flat target area 1200, then the target area locator 310 in step 1325 determines whether the current flatness value is still less than a predetermined maximum tolerance. If still less than the maximum tolerance, the target area locator 310 in step 1330 increases the flatness value by one and returns to step 1310. If the current flatness value equals the maximum tolerance, the target area locator 310 in step 1335 fails to locate a flat area and method 1300 ends.

Figure 14A:
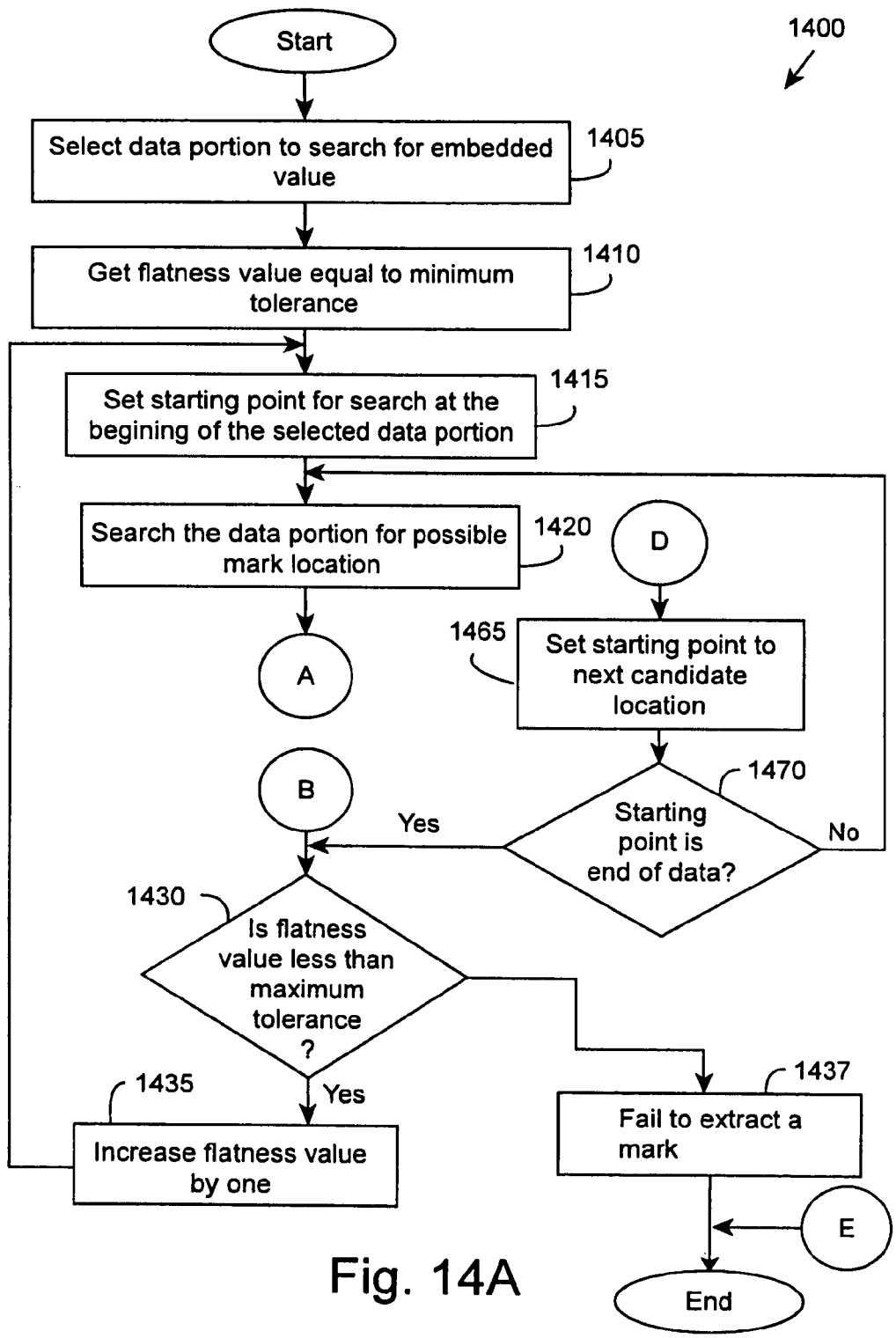
FIGS. 14A and 14B are a flowchart illustrating a method of locating a mark in a data portion.
Figure 14B:
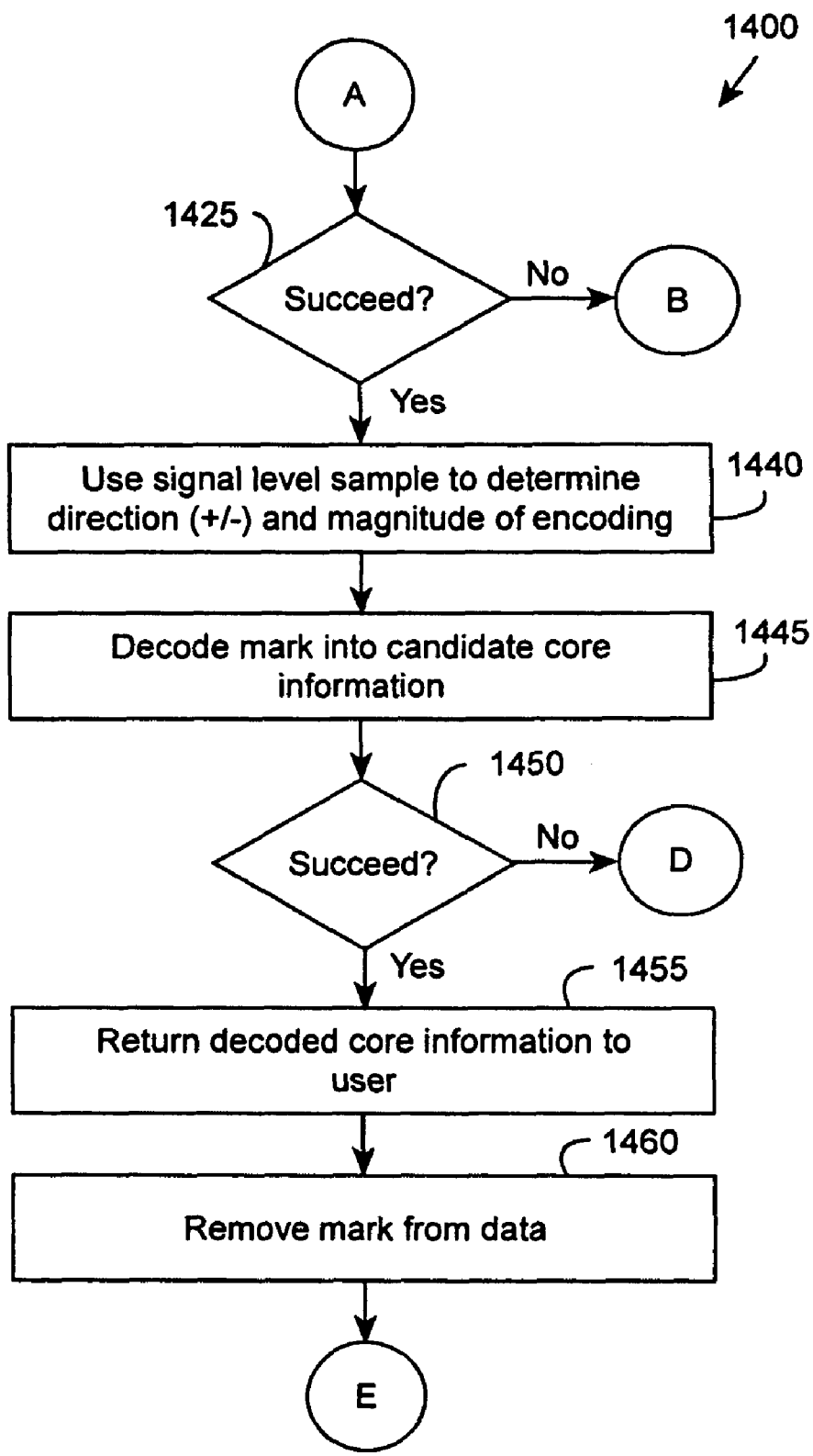

FIGS. 14A and 14B are a flowchart illustrating a method 1400 of locating a mark in a data portion. Method 1400 begins with the data portion selector 405 in step 1405 selecting a data portion to search for an embedded mark 1205. The mark area locator 410 in step 1410 sets the flatness value equal to a predetermined minimum tolerance, e.g., three, and in step 1415 sets the starting point for searching the selected data portion at the beginning. The mark area locator 410 in step 1420 searches the selected data portion at the starting point for a possible mark.

If the mark area locator 410 in step 1425 fails, the mark area locator 410 in step 1430 determines whether the current flatness value is less than a predetermined maximum tolerance. If so, then the mark area locator 410 in step 1435 increases the flatness value by one and returns to step 1415. If not, then the mark area locator 410 in step 1437 fails to extract a mark, because no mark area can be located, and method 1400 ends.

If the mark area locator 410 in step 1425 succeeds in finding a possible mark area, the unmarker 425 in step 1440 uses the known lows and highs, such as the values of the known embedded signal level sample 1110, to determine the encoding direction (whether a high is higher than or lower than a low) and the encoding magnitudes (by how much). An example of decoding is described with reference to FIG. 12C.

The unmarker 425 in step 1445 decodes the mark into candidate core information, and in step 1450 determines if the located mark can be presumed correct. This presumption can be assumed by checking the located information against known information such as a digital signature. If the candidate core information is correct, then the unmarker 425 in step 1455 returns the decoded core information to the user and in step 1460 removes the mark from the data portion. Method 1400 then ends. If the candidate core information is incorrect, then the unmarker 425 in step 1465 sets the starting point to the next candidate location, e.g., by shifting over one location. The unmarker 425 in step 1470 determines whether the start point equals the end of the data. If not, then method 1400 returns to step 1420. Otherwise, method 1400 returns to step 1430.

The foregoing description of the preferred embodiments of the present invention is by way of example only, and other variations and modifications of the above-described embodiments and methods are possible in light of the foregoing teaching. For example, although the above embodiments include a core 625 containing content-identifying information, the core 625 can additionally or alternatively contain other information. Although the nodes are being described as separate and distinct nodes, one skilled in the art will recognize that these nodes may be a part of an integral node, may each include portions of multiple nodes, or may include combinations of single and multiple nodes. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. An apparatus for encoding a mark into digital data, the apparatus comprising:
a data receiver to receive an unencoded data of an audio recording, the data receiver comprising an encoder, the encoder comprising:
a target area locator to locate, in the unencoded digital data of the audio recording, using a predetermined pattern, at least two values that represent a flat area by calculating a variability for a selected portion of the unencoded digital data using the predetermined pattern and locating the at least two values that represent the flat area if the calculated variability for the selected portion is less than a predetermined amount;
a marker to modify at least one of the values in the flat area to encode a mark into the flat area of the audio recording; and
a processor coupled to the data receiver, the processor to communicate with the data receiver to create the encoded data of the audio recording.

2. The apparatus of claim 1, wherein the predetermined pattern is a regular pattern.

3. The apparatus of claim 1, wherein the predetermined pattern is an irregular pattern.

4. The apparatus of claim 1, wherein the predetermined pattern identifies a consecutive set of values.

5. The apparatus of claim 1, wherein the marker modifies the at least one value in the flat area to encode a mark into the flat area of the audio recording according to a recognizable amount.

6. The apparatus of claim 5, wherein the marker modifies the values in the flat area to encode a mark into the flat area of the audio recording by adding the recognizable amount to the at least one value.

7. The apparatus of claim 5, wherein the marker modifies the values in the flat area to encode a mark into the flat area of the audio recording by subtracting the recognizable amount from the at least one value.

8. The apparatus of claim 5, wherein the encoder computes the recognizable amount by calculating a function of the variability in the flat area.

9. The apparatus of claim 5, wherein the encoder computes the recognizable amount as a multiple of the variability in the flat area.

10. The apparatus of claim 1, wherein the marker modifies the at least one value in the flat area to provide at least one known peak in the flat area.

11. The apparatus of claim 1, wherein the marker modifies at least two of the values in the digital data to represent a single mark value in the flat area.

12. The apparatus of claim 1, wherein the target area locator locates, in the digital data, using a predetermined pattern, at least two values that represent a second flat area and wherein the marker modifies at least one value in the second flat area to encode the mark into the second flat area.

13. The apparatus of claim 1, wherein the encoder further comprises a format conversion engine to convert a format of the digital data.

14. The apparatus of claim 1, wherein the apparatus is implemented in at least one computer, the at least on computer accessing a memory.

15. The apparatus of claim 1, wherein the apparatus is implemented in a computer.

16. The apparatus of claim 1, wherein the predetermined pattern is one dimensional.

17. The apparatus of claim 1, wherein the predetermined pattern is two dimensional.

18. The apparatus of claim 1, wherein the predetermined pattern is three dimensional.

19. An apparatus for encoding a mark into digital data, the apparatus comprising:
- a target area locator to locate, in the unencoded digital data of the audio recording, using a predetermined pattern, at least two values that represent a flat area by calculating a variability for a selected portion of the unencoded digital data using the predetermined pattern and locating the at least two values that represent the flat area if the calculated variability for the selected portion is less than a predetermined amount;
- a marker to modify at least one of the values in the flat area to encode a mark into the flat area of the audio recording; and
- a processor to communicate with the target area locator.

* * * * *